US012500945B2

(12) United States Patent
Smith et al.

(10) Patent No.: US 12,500,945 B2
(45) Date of Patent: *Dec. 16, 2025

(54) VIRTUAL INTERACTION SESSION TO FACILITATE REAL-TIME COMMUNICATION BETWEEN MULTIPLE USERS

(71) Applicant: Snap Inc., Santa Monica, CA (US)

(72) Inventors: Brian Anthony Smith, New York, NY (US); Yu Jiang Tham, Los Angeles, CA (US); Rajan Vaish, Beverly Hills, CA (US); Hemant Surale, Waterloo (CA)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,553

(22) Filed: Feb. 23, 2024

(65) Prior Publication Data

US 2024/0195848 A1 Jun. 13, 2024

Related U.S. Application Data

(63) Continuation of application No. 17/207,174, filed on Mar. 19, 2021, now Pat. No. 11,985,175.
(Continued)

(51) Int. Cl.
*H04L 65/1093* (2022.01)
*G02B 27/01* (2006.01)
(Continued)

(52) U.S. Cl.
CPC ........ *H04L 65/1093* (2013.01); *G02B 27/017* (2013.01); *G06T 19/006* (2013.01); *H04L 65/1096* (2013.01); *G06T 2219/024* (2013.01)

(58) Field of Classification Search
None
See application file for complete search history.

(56) References Cited

U.S. PATENT DOCUMENTS 10,353,532 B1 7/2019 Holz et al.
10,897,564 B1 1/2021 Smith et al.
(Continued)

FOREIGN PATENT DOCUMENTS

CN 101256597 A 9/2008
CN 101518148 8/2009
(Continued)

OTHER PUBLICATIONS

"U.S. Appl. No. 18/477,130, Final Office Action mailed Apr. 3, 2025", 18 pgs.
(Continued)

*Primary Examiner* — William G Trost, IV
*Assistant Examiner* — Christopher P Cadorna
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interface to facilitate augmented reality based communication between multiple users over a network. Session configuration data including configuration parameters of a virtual interaction session with a first user is received from a first device. The configuration parameters include an identifier of a second user that is permitted to join the virtual interaction session and a micro-chat duration that defines a time limit for a real-time communication link between the first and second user during the virtual interaction session. The real-time communication link between the first and second user by causing display, by the second device, of a live camera feed generated at the first device.
(Continued)

Upon expiration of the micro-chat duration, the real-time communication link between the first and second user is terminated.

20 Claims, 19 Drawing Sheets

Related U.S. Application Data

(60) Provisional application No. 62/994,671, filed on Mar. 25, 2020.

(51) Int. Cl.
*G06T 19/00* (2011.01)
*H04L 65/1096* (2022.01)

(56) References Cited

U.S. PATENT DOCUMENTS

| | | |
|---|---|---|
| 11,064,113 B1 | 7/2021 | Weber et al. |
| 11,290,632 B2 | 3/2022 | Smith et al. |
| 11,340,857 B1 | 5/2022 | Smith et al. |
| 11,593,997 B2 | 2/2023 | Smith et al. |
| 11,606,491 B2 | 3/2023 | Smith et al. |
| 11,829,679 B2 | 11/2023 | Smith et al. |
| 11,856,288 B2 | 12/2023 | Smith et al. |
| 11,985,175 B2 | 5/2024 | Smith et al. |
| 12,101,360 B2 | 9/2024 | Smith et al. |
| 12,182,903 B2 | 12/2024 | Smith et al. |
| 12,211,156 B2 | 1/2025 | Smith et al. |
| 2006/0170652 A1 | 8/2006 | Bannai et al. |
| 2007/0024527 A1 | 2/2007 | Heikkinen et al. |
| 2008/0034040 A1 | 2/2008 | Wherry et al. |
| 2009/0237328 A1 | 9/2009 | Gyorfi et al. |
| 2011/0161507 A1 | 6/2011 | Osullivan et al. |
| 2012/0081393 A1 | 4/2012 | Kim |
| 2012/0198531 A1* | 8/2012 | Ort .................. H04W 12/06 709/227 |
| 2012/0249741 A1 | 10/2012 | Maciocci et al. |
| 2013/0178257 A1 | 7/2013 | Langseth |
| 2013/0293468 A1 | 11/2013 | Perez et al. |
| 2014/0043426 A1 | 2/2014 | Bicanic et al. |
| 2014/0132630 A1 | 5/2014 | Mun et al. |
| 2014/0372540 A1 | 12/2014 | Libin |
| 2015/0235267 A1 | 8/2015 | Steube et al. |
| 2016/0066036 A1 | 3/2016 | Felt et al. |
| 2016/0100034 A1 | 4/2016 | Miller |
| 2016/0133230 A1 | 5/2016 | Daniels et al. |
| 2016/0142629 A1 | 5/2016 | Jung et al. |
| 2016/0217623 A1 | 7/2016 | Singh |
| 2016/0260256 A1 | 9/2016 | Shefi |
| 2017/0021273 A1 | 1/2017 | Rios |
| 2017/0160815 A1 | 6/2017 | Glazier et al. |
| 2017/0352187 A1 | 12/2017 | Haines |
| 2018/0205797 A1 | 7/2018 | Faulkner |
| 2018/0295271 A1 | 10/2018 | Kim |
| 2018/0322706 A1 | 11/2018 | Drouin et al. |
| 2019/0068390 A1 | 2/2019 | Gross et al. |
| 2019/0107990 A1 | 4/2019 | Spivack et al. |
| 2019/0108907 A1 | 4/2019 | Kadri et al. |
| 2019/0318540 A1 | 10/2019 | Piemonte et al. |
| 2019/0391724 A1 | 12/2019 | Holz et al. |
| 2020/0045519 A1 | 2/2020 | Raleigh et al. |
| 2020/0186576 A1 | 6/2020 | Gopal et al. |
| 2020/0244711 A1* | 7/2020 | Engel .................. H04L 65/403 |
| 2020/0371673 A1 | 11/2020 | Faulkner |
| 2021/0105397 A1 | 4/2021 | Smith et al. |
| 2021/0304450 A1 | 9/2021 | Smith et al. |
| 2021/0304507 A1 | 9/2021 | Smith et al. |
| 2021/0306386 A1 | 9/2021 | Smith et al. |
| 2021/0306387 A1 | 9/2021 | Smith et al. |
| 2022/0182530 A1 | 6/2022 | Smith et al. |
| 2022/0214856 A1 | 7/2022 | Smith et al. |
| 2023/0177786 A1 | 6/2023 | Smith et al. |
| 2023/0188837 A1 | 6/2023 | Smith et al. |
| 2024/0031674 A1 | 1/2024 | Smith et al. |
| 2024/0036805 A1 | 2/2024 | Smith et al. |
| 2024/0333778 A1 | 10/2024 | Smith et al. |
| 2025/0118035 A1 | 4/2025 | Smith et al. |

FOREIGN PATENT DOCUMENTS

| | | |
|---|---|---|
| CN | 108734784 A | 11/2018 |
| CN | 108881784 A | 11/2018 |
| CN | 108886523 A | 11/2018 |
| CN | 109391851 A | 2/2019 |
| CN | 109891365 A | 6/2019 |
| CN | 110083227 A | 8/2019 |
| CN | 115668102 A | 1/2023 |
| CN | 115668891 A | 1/2023 |
| CN | 115668897 A | 1/2023 |
| CN | 115698908 A | 2/2023 |
| KR | 102515040 B1 | 3/2023 |
| KR | 102719300 | 10/2024 |
| KR | 102800720 B1 | 4/2025 |
| WO | 2008011233 | 6/2008 |
| WO | WO-2016103115 A1 | 6/2016 |
| WO | WO-2019055703 A2 | 3/2019 |
| WO | WO-2021195100 A1 | 9/2021 |
| WO | WO-2021195125 A1 | 9/2021 |
| WO | WO-2021195233 A1 | 9/2021 |
| WO | WO-2021202241 A1 | 10/2021 |

OTHER PUBLICATIONS

"U.S. Appl. No. 18/477,130, Response filed Mar. 19, 2025 to Non Final Office Action mailed Dec. 20, 2024", 10 pgs.
"U.S. Appl. No. 18/479,547, Non Final Office Action mailed Apr. 9, 2025", 6 pgs.
"Chinese Application Serial No. 202180037702.5, Office Action mailed Mar. 22, 2025", W/English Translation, 24 pgs.
"Chinese Application Serial No. 202180038601.X, Office Action mailed Mar. 27, 2025", W/English Translation, 21 pgs.
"Korean Application Serial No. 10-2022-7036915, Response filed Jan. 21, 2025 to Notice of Preliminary Rejection mailed Oct. 30, 2024", w/ English Claims, 25 pgs.
"Korean Application Serial No. 10-2022-7036916, Response filed Aug. 1, 2024 to Notice of Preliminary Rejection mailed Jun. 5, 2024", w/ English claims, 21 pgs.
"Korean Application Serial No. 10-2022-7036916, Voluntary Amendment filed Feb. 20, 2024", w/ English claims, 24 pgs.
"Korean Application Serial No. 10-2023-7010071, Response filed Jan. 23, 2025 to Notice of Preliminary Rejection mailed Oct. 29, 2024", w/ English Claims, 16 pgs.
"Korean Application Serial No. 10-2023-7010071, Voluntary Amendment filed Oct. 24, 2024", w/ English claims, 27 pgs.
"Korean Application Serial No. 10-2024-7034270, Response filed Jan. 24, 2025 to Notice of Preliminary Rejection mailed Oct. 27, 2024", w/ English Claims, 18 pgs.
"Korean Application Serial No. 10-2022-7036916, Notice of Preliminary Rejection mailed Jun. 5, 2024", W English Translation, 4 pgs.
"U.S. Appl. No. 18/163,098, Final Office Action mailed Jun. 25, 2024", 22 pgs.
"U.S. Appl. No. 17/206,991, Response filed Jul. 5, 2024 to Non Final Office Action mailed Apr. 4, 2024", 13 pgs.
"European Application Serial No. 21718771.5, Communication Pursuant to Article 94(3) EPC mailed Jul. 4, 2024", 8 pgs.
"U.S. Appl. No. 17/206,991, Notice of Allowance mailed Aug. 2, 2024", 10 pgs.
"European Application Serial No. 21779785.1, Response filed Aug. 8, 2024 to Extended European Search Report mailed Feb. 5, 2024", 25 pgs.
"U.S. Appl. No. 18/163,098, Response filed Aug. 13, 2024 to Final Office Action mailed Jun. 25, 2024", 12 pgs.
"U.S. Appl. No. 18/163,098, Advisory Action mailed Aug. 22, 2024", 3 pgs.

(56) References Cited

OTHER PUBLICATIONS

"U.S. Appl. No. 17/207,080, Corrected Notice of Allowability mailed Aug. 26, 2024", 4 pgs.
U.S. Appl. No. 18/984,002, filed Dec. 17, 2024, Context Based Augmented Reality Communication.
"Chinese Application Serial No. 202180038601.X, Response filed Jun. 24, 2025 to Office Action mailed Mar. 27, 2025", w English Claims, 14 pgs.
"U.S. Appl. No. 18/479,547, Response filed Jun. 30, 2025 to Non Final Office Action mailed Apr. 9, 2025", 10 pgs.
"U.S. Appl. No. 18/477,130, Response filed Jul. 1, 2025 to Final Office Action mailed Apr. 3, 2025", 9 pgs.
"Chinese Application Serial No. 202180037702.5, Response filed Jul. 17, 2025 to Office Action mailed Mar. 22, 2025", w English Claims, 16 pgs.
"U.S. Appl. No. 18/479,547, Notice of Allowance mailed Jul. 22, 2025", 8 pgs.
"U.S. Appl. No. 18/163,098, Notice of Allowance mailed Sep. 23, 2024", 8 pgs.
"European Application Serial No. 21718771.5, Response filed Oct. 23, 2024 to Communication Pursuant to Article 94(3) EPC mailed Jul. 4, 2024", 32 pgs.
"Korean Application Serial No. 10-2024-7034270, Notice of Preliminary Rejection mailed Oct. 27, 2024", W English Translation, 4 pgs.
"Korean Application Serial No. 10-2023-7010071, Notice of Preliminary Rejection mailed Oct. 29, 2024", w English Translation, 4 pgs.
"Korean Application Serial No. 10-2022-7036915, Notice of Preliminary Rejection mailed Oct. 30, 2024", w English translation, 7 pgs.
"U.S. Appl. No. 18/477,130, Non Final Office Action mailed Dec. 20, 2024", 31 pgs.
U.S. Appl. No. 16/443,614 U.S. Pat. No. 10,897,564, filed Jun. 17, 2019, Shared Control of Camera Device by Multiple Devices.
U.S. Appl. No. 17/125,298 U.S. Pat. No. 11,290,632, filed Dec. 17, 2020, Shared Control of Camera Device by Multiple Devices.
U.S. Appl. No. 17/679,616 U.S. Pat. No. 11,606,491, filed Feb. 24, 2022, Request Queue for Shared Control of Camera Device by Multiple Devices.
U.S. Appl. No. 18/165,777 U.S. Pat. No. 11,856,288, filed Feb. 7, 2023, Request Queue for Shared Control of Camera Device by Multiple Devices.
U.S. Appl. No. 18/479,547, filed Oct. 2, 2023, Request Queue for Shared Control of Camera Device by Multiple Devices.
U.S. Appl. No. 17/703,567 U.S. Pat. No. 11,829,679, filed Mar. 24, 2022, Shared Control of a Virtual Object by Multiple Devices.
U.S. Appl. No. 16/947,083 U.S. Pat. No. 11,340,857, filed Jul. 17, 2020, Shared Control of a Virtual Object by Multiple Devices.
U.S. Appl. No. 18/477,130, filed Sep. 28, 2023, Shared Control of a Virtual Object by Multiple Devices.
U.S. Appl. No. 17/206,991, filed Mar. 19, 2021, Augmented Reality Based Communication Between Multiple Users.
U.S. Appl. No. 17/207,080, filed Mar. 19, 2021, Virtual Interaction Session to Facilitate Augmented Reality Based Communication Between Multiple Users.
U.S. Appl. No. 17/207,174, filed Mar. 19, 2021, Virtual Interaction Session to Facilitate Time Limited Augmented Reality Based Communication Between Multiple Users.
U.S. Appl. No. 17/210,291 U.S. Pat. No. 11,593,997, filed Mar. 23, 2021, Context Based Augmented Reality Communication.
U.S. Appl. No. 18/163,098, filed Feb. 1, 2023, Context Based Augmented Reality Communication.
"U.S. Appl. No. 16/443,614, Non Final Office Action mailed Jun. 2, 2020", 7 pgs.
"U.S. Appl. No. 16/443,614, Notice of Allowance mailed Sep. 14, 2020", 8 pgs.
"U.S. Appl. No. 16/443,614, Notice of Allowance mailed Sep. 23, 2020", 5 pgs.
"U.S. Appl. No. 16/443,614, Response filed Aug. 24, 2020 to Non Final Office Action mailed Jun. 2, 2020", 9 pgs.
"U.S. Appl. No. 16/947,083, 312 Amendment filed Apr. 14, 2022", 7 pgs.
"U.S. Appl. No. 16/947,083, Corrected Notice of Allowability mailed Apr. 26, 2022", 3 pgs.
"U.S. Appl. No. 16/947,083, Examiner Interview Summary mailed Nov. 8, 2021", 2 pgs.
"U.S. Appl. No. 16/947,083, Final Office Action mailed Aug. 6, 2021", 29 pgs.
"U.S. Appl. No. 16/947,083, Non Final Office Action mailed Mar. 19, 2021", 26 pgs.
"U.S. Appl. No. 16/947,083, Notice of Allowance mailed Jan. 21, 2022", 12 pgs.
"U.S. Appl. No. 16/947,083, Response filed Jul. 13, 2021 to Non Final Office Action mailed Mar. 19, 2021", 11 pgs.
"U.S. Appl. No. 16/947,083, Response filed Nov. 8, 2021 to Final Office Action mailed Aug. 6, 2021", 12 pgs.
"U.S. Appl. No. 17/125,298, Non Final Office Action mailed Aug. 16, 2021", 8 pgs.
"U.S. Appl. No. 17/125,298, Notice of Allowance mailed Nov. 26, 2021", 8 pgs.
"U.S. Appl. No. 17/125,298, Response filed Nov. 9, 2021 to Non Final Office Action mailed Aug. 16, 2021", 8 pgs.
"U.S. Appl. No. 17/206,991, Examiner Interview Summary mailed Feb. 22, 2023", 2 pgs.
"U.S. Appl. No. 17/206,991, Examiner Interview Summary mailed Oct. 5, 2023", 2 pgs.
"U.S. Appl. No. 17/206,991, Final Office Action mailed Feb. 16, 2023", 14 pgs.
"U.S. Appl. No. 17/206,991, Final Office Action mailed Nov. 16, 2023", 25 pgs.
"U.S. Appl. No. 17/206,991, Non Final Office Action mailed Jun. 29, 2023", 21 pgs.
"U.S. Appl. No. 17/206,991, Non Final Office Action mailed Oct. 20, 2022", 13 pgs.
"U.S. Appl. No. 17/206,991, Response filed Jan. 16, 2024 to Final Office Action mailed Nov. 16, 2023", 14 pgs.
"U.S. Appl. No. 17/206,991, Response filed Jan. 18, 2023 to Non Final Office Action mailed Oct. 20, 2022", 12 pgs.
"U.S. Appl. No. 17/206,991, Response filed May 8, 2023 to Final Office Action mailed Feb. 16, 2023", 13 pgs.
"U.S. Appl. No. 17/206,991, Response filed Sep. 28, 2023 to Non Final Office Action mailed Jun. 29, 2023", 12 pgs.
"U.S. Appl. No. 17/207,080, Final Office Action mailed Apr. 28, 2023", 11 pgs.
"U.S. Appl. No. 17/207,080, Final Office Action mailed Nov. 28, 2023", 13 pgs.
"U.S. Appl. No. 17/207,080, Non Final Office Action mailed Aug. 16, 2023", 14 pgs.
"U.S. Appl. No. 17/207,080, Non Final Office Action mailed Oct. 6, 2022", 9 pgs.
"U.S. Appl. No. 17/207,080, Response filed Jan. 5, 2023 to Non Final Office Action mailed Oct. 6, 2022", 11 pgs.
"U.S. Appl. No. 17/207,080, Response filed Feb. 21, 2024 to Final Office Action mailed Nov. 28, 2023", 12 pgs.
"U.S. Appl. No. 17/207,080, Response filed Jul. 27, 2023 to Final Office Action mailed Apr. 28, 2023", 12 pgs.
"U.S. Appl. No. 17/207,080, Response filed Nov. 10, 2023 to Non Final Office Action mailed Aug. 16, 2023", 10 pgs.
"U.S. Appl. No. 17/207,174, Examiner Interview Summary mailed Dec. 8, 2023", 2 pgs.
"U.S. Appl. No. 17/207,174, Final Office Action mailed Apr. 27, 2023", 17 pgs.
"U.S. Appl. No. 17/207,174, Non Final Office Action mailed Sep. 1, 2023", 16 pgs.
"U.S. Appl. No. 17/207,174, Non Final Office Action mailed Oct. 6, 2022", 15 pgs.
"U.S. Appl. No. 17/207,174, Notice of Allowance mailed Jan. 5, 2024", 16 pgs.
"U.S. Appl. No. 17/207,174, Response filed Jan. 5, 2023 to Non Final Office Action mailed Oct. 6, 2022", 10 pgs.

(56) References Cited

OTHER PUBLICATIONS

"U.S. Appl. No. 17/207,174, Response filed Jul. 27, 2023 to Final Office Action mailed Apr. 27, 2023", 13 pgs.
"U.S. Appl. No. 17/207,174, Response filed Nov. 30, 2023 to Non Final Office Action mailed Sep. 1, 2023", 13 pgs.
"U.S. Appl. No. 17/210,291, 312 Amendment filed Jan. 9, 2023", 9 pgs.
"U.S. Appl. No. 17/210,291, Corrected Notice of Allowability mailed Oct. 26, 2022", 2 pgs.
"U.S. Appl. No. 17/210,291, Examiner Interview Summary mailed Dec. 27, 2021", 3 pgs.
"U.S. Appl. No. 17/210,291, Final Office Action mailed Feb. 2, 2022", 51 pgs.
"U.S. Appl. No. 17/210,291, Non Final Office Action mailed May 13, 2022", 50 pgs.
"U.S. Appl. No. 17/210,291, Non Final Office Action mailed Sep. 22, 2021", 37 pgs.
"U.S. Appl. No. 17/210,291, Notice of Allowance mailed Oct. 19, 2022", 8 pgs.
"U.S. Appl. No. 17/210,291, Response filed May 2, 2022 to Final Office Action mailed Feb. 2, 2022", 11 pgs.
"U.S. Appl. No. 17/210,291, Response filed Sep. 13, 2022 to Non Final Office Action mailed May 13, 2022", 11 pgs.
"U.S. Appl. No. 17/210,291, Response filed Dec. 22, 2021 to Non Final Office Action mailed Sep. 22, 2021", 12 pgs.
"U.S. Appl. No. 17/210,291, Supplemental Notice of Allowability mailed Jan. 19, 2023", 11 pgs.
"U.S. Appl. No. 17/679,616, Corrected Notice of Allowability mailed Feb. 15, 2023", 2 pgs.
"U.S. Appl. No. 17/679,616, Notice of Allowance mailed Nov. 7, 2022", 9 pgs.
"U.S. Appl. No. 17/703,567, Corrected Notice of Allowability mailed Oct. 11, 2023", 2 pgs.
"U.S. Appl. No. 17/703,567, Non Final Office Action mailed Mar. 31, 2023", 13 pgs.
"U.S. Appl. No. 17/703,567, Notice of Allowance mailed Jul. 13, 2023", 7 pgs.
"U.S. Appl. No. 17/703,567, Response filed Jun. 14, 2023 to Non Final Office Action mailed Mar. 31, 2023", 9 pgs.
"U.S. Appl. No. 18/163,098, Final Office Action mailed Nov. 27, 2023", 40 pgs.
"U.S. Appl. No. 18/163,098, Non Final Office Action mailed Feb. 2, 2024", 20 pgs.
"U.S. Appl. No. 18/163,098, Non Final Office Action mailed Jul. 14, 2023", 26 pgs.
"U.S. Appl. No. 18/163,098, Response filed Jan. 19, 2024 to Final Office Action mailed Nov. 27, 2023", 13 pgs.
"U.S. Appl. No. 18/163,098, Response filed Oct. 16, 2023 to Non Final Office Action mailed Jul. 14, 2023", 13 pgs.
"U.S. Appl. No. 18/165,777, Corrected Notice of Allowability mailed Nov. 22, 2023", 2 pgs.
"U.S. Appl. No. 18/165,777, Notice of Allowance mailed Jul. 19, 2023", 9 pgs.
"European Application Serial No. 21779785.1, Extended European Search Report mailed Feb. 5, 2024", 12 pgs.
"European Application Serial No. 21779785.1, Response Filed Dec. 2, 2022 to Communication pursuant to Rules 161(2) and 162 EPC mailed Nov. 9, 2023", 25 pgs.
"International Application Serial No. PCT/US2021/023712, International Preliminary Report on Patentability mailed Oct. 6, 2022", 8 pgs.
"International Application Serial No. PCT/US2021/023712, International Search Report mailed Jun. 29, 2021", 4 pgs.
"International Application Serial No. PCT/US2021/023712, Written Opinion mailed Jun. 29, 2021", 6 pgs.
"International Application Serial No. PCT/US2021/023748, International Preliminary Report on Patentability mailed Oct. 6, 2022", 8 pgs.
"International Application Serial No. PCT/US2021/023748, International Search Report mailed Jun. 29, 2021", 4 pgs.
"International Application Serial No. PCT/US2021/023748, Written Opinion mailed Jun. 29, 2021", 6 pgs.
"International Application Serial No. PCT/US2021/023918, International Preliminary Report on Patentability mailed Oct. 6, 2022", 9 pgs.
"International Application Serial No. PCT/US2021/023918, International Search Report mailed Jun. 28, 2021", 4 pgs.
"International Application Serial No. PCT/US2021/023918, Written Opinion mailed Jun. 28, 2021", 7 pgs.
"International Application Serial No. PCT/US2021/024180, International Preliminary Report on Patentability mailed Oct. 13, 2022", 6 pgs.
"International Application Serial No. PCT/US2021/024180, International Search Report mailed Jul. 6, 2021", 5 pgs.
"International Application Serial No. PCT/US2021/024180, Written Opinion mailed Jul. 6, 2021", 4 pgs.
Payette, Chuck, et al., "Enabling reliable and efficient wireless video uplink", Bell Labs Technical Journal, Wiley, CA, US, vol. 16, No. 2, (Sep. 1, 2011), 169-191.
"European Application Serial No. 21718750.9, Communication Pursuant to Article 94(3) EPC mailed Mar. 5, 2024", 4 pgs.
"European Application Serial No. 21718752.5, Communication Pursuant to Article 94(3) EPC mailed Mar. 13, 2024", 5 pgs.
"U.S. Appl. No. 17/207,080, Notice of Allowance mailed Mar. 22, 2024", 7 pgs.
"U.S. Appl. No. 18/163,098, Response filed Mar. 28, 2024 to Non Final Office Action mailed Feb. 2, 2024", 12 pgs.
"U.S. Appl. No. 17/206,991, Non Final Office Action mailed Apr. 4, 2024", 24 pgs.
"U.S. Appl. No. 17/207,174, Corrected Notice of Allowability mailed Apr. 8, 2024", 2 pgs.
"Chinese Application Serial No. 202180037702.5, Office Action mailed Aug. 1, 2025", w English translation, 22 pgs.
"European Application Serial No. 21718752.5, Communication Pursuant to Article 943 EPC mailed Oct. 15, 2025", 4 pgs.
"European Application Serial No. 21718750.9, Communication Pursuant to Article 943 EPC mailed Oct. 20, 2025", 5 pgs.
"U.S. Appl. No. 18/477,130, Response filed Oct. 24, 25 to Non Final Office Action mailed Jul. 30, 2025", 11 pgs.
"Chinese Application Serial No. 202180037702.5, Response filed Sep. 28, 2025 to Office Action mailed Aug. 1, 2025", W English Claims, 17 pgs.

* cited by examiner

VIRTUAL INTERACTION SESSION TO FACILITATE REAL-TIME COMMUNICATION BETWEEN MULTIPLE USERS

CLAIM OF PRIORITY

This application is a continuation of U.S. patent application Ser. No. 17/207,174, filed Mar. 19, 2021, which application claims the benefit of priority to U.S. Provisional Application Ser. No. 62/994,671, filed on Mar. 25, 2020, which is incorporated herein by reference in its entirety.

TECHNICAL FIELD

The present disclosure generally relates to mobile and wearable computing technology. In particular, example embodiments of the present disclosure address systems, methods, and user interfaces to facilitate augmented reality based communication between multiple users over a network.

BACKGROUND

Many wearable and mobile devices such as "smart" glasses include an embedded camera. Virtual rendering systems implemented using these types of devices can be used to create engaging and entertaining augmented reality experiences, in which three-dimensional (3D) graphic content appears to be present in the real world.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
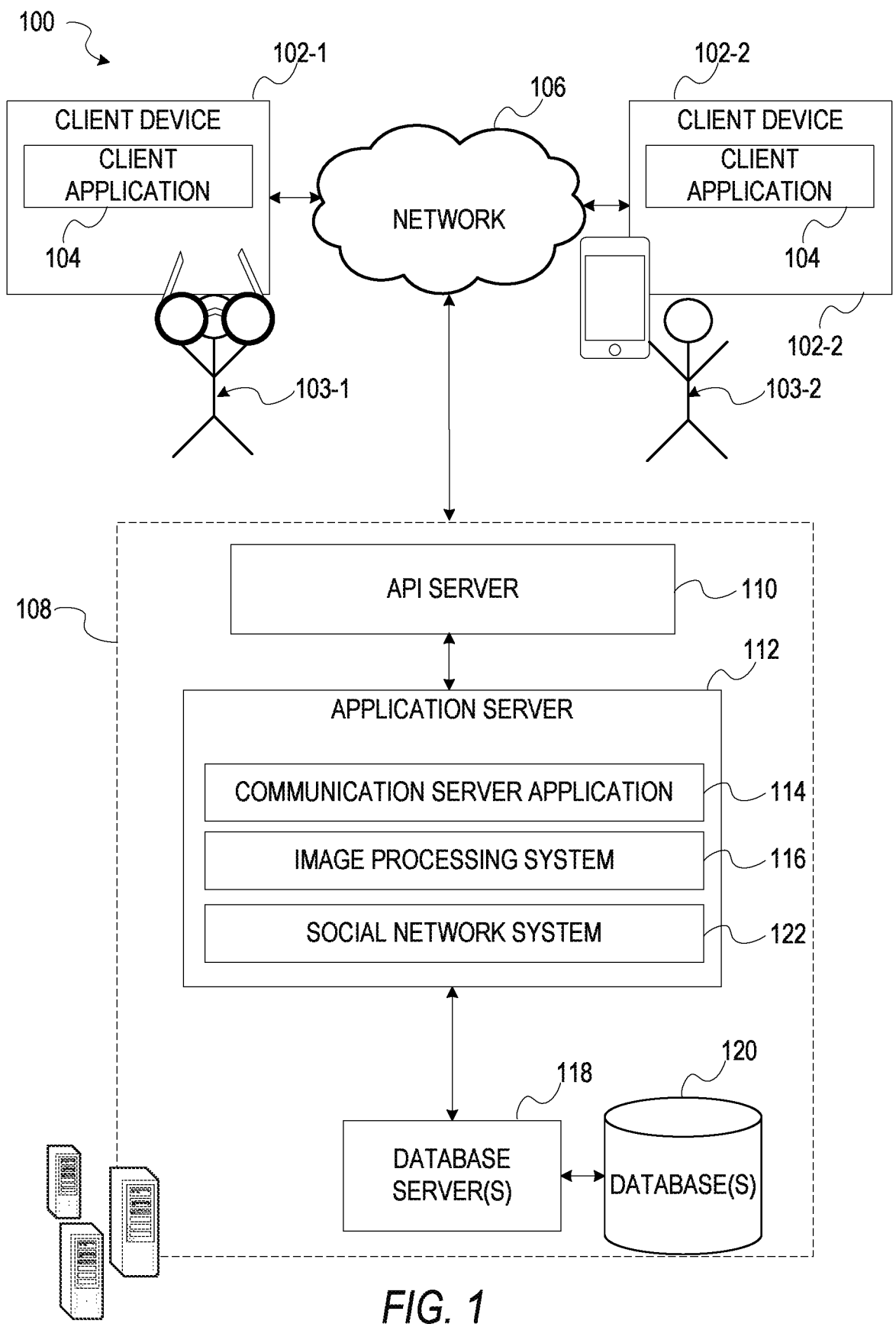
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for facilitating virtual interaction sessions between users. In the context of a virtual interaction, one or more users may establish a real-time communication link with a host user. When a real-time communication link is established between a first user and a second user, a live camera feed that depicts a real-world environment at the location of the first user is presented to the second user. As an example, the first user may be wearing a wearable device that includes a camera and optical elements that include a display from which the real-world environment is visible to the first user. During an active virtual interaction session with the first user, a real-time communication link between the first and second user can be established and as part of the real-time communication link the second user can view the real-world environment of the first user via the live camera feed generated by the camera of the first user's wearable device and displayed by a device of the second user. A real-time communication link can be initiated by the first user (the host user) by inviting the second user to join the virtual interaction session and the real-time communication link is established based on the second user accepting the invitation.

While real-time communication link is active, the first and second user can communicate verbally using an audio communication link between devices and also using augmented reality based communication methods. For example, in addition to the live camera feed of the first user, the second user's device may also display a set of selectable virtual content items that can be applied to the real-world environment that is visible to the first user. Each virtual content item includes one or more media objects. Following the example above, a virtual content item selected by the second user can be transmitted to the first user's wearable device. The virtual content item can be applied to the real-world environment that is visible to the first user by causing one or more media objects to be displayed over the real-world environmenta display of the first user's wearable device. In this way, the one or more media objects appear to the first user as though they exist in the real-world environment, augmenting the first user's reality.

A single virtual interaction session can include multiple virtual interaction sessions and multiple users can interact with the first user (the host user) in one or more virtual interaction session during a real-time communication session. To provide control and privacy mechanisms to the first user of the virtual interaction session, a configuration interface may be provided for display to the first user via the wearable device or a companion device coupled to the wearable device. The first user can use the configuration interface to define configuration parameters for the virtual interaction session. The configuration parameters include a session duration that defines a time period for the virtual interaction session. At expiration of the session duration, no additional real-time communication links can be established with the first user.

The configuration parameters may also include a micro-chat duration that defines a time limit for real-time communication links with the first user established during the virtual interaction session. The first user may use the configuration interface to define a micro-chat duration for the virtual interaction session. While the real-time communication link is established between the first and second user, a countdown timer based on the session duration may be displayed by both users' devices, and at expiration of the session duration, the real-time communication link between the two users is terminated. That is, the display of the first user's live camera feed is terminated on the second user's device and the audio communication link between the two users' devices is disabled. While a virtual interaction session is still active, the second user may request to establish a second real-time communication link with the first user, or a third user who is authorized to join the virtual interaction session may request to establish a real-time communication link with the first user.

FIG. 1 is a block diagram showing an example communication system 100 for exchanging data (e.g., messages and associated content) over a network. The communication system 100 includes multiple instances of a client device 102 (102-1 and 102-2). Each instance of the client device 102 hosts a number of applications including a communication client application 104. Each communication client application 104 is communicatively coupled to other instances of the communication client application 104 and a communication server system 108 via a network 106 (e.g., the Internet).

A communication client application 104 is able to communicate and exchange data with another communication client application 104 and with the communication server system 108 via the network 106. The data exchanged between communication client application 104, and between a communication client application 104 and the communication server system 108, includes functions (e.g., commands to invoke functions) as well as payload data (e.g., text, audio, video or other multimedia data).

The communication server system 108 provides server-side functionality via the network 106 to a particular communication client application 104. While certain functions of the communication system 100 are described herein as being performed by either a communication client application 104 or by the communication server system 108, the location of certain functionality either within the communication client application 104 or the communication server system 108 is a design choice. For example, it may be technically preferable to initially deploy certain technology and functionality within the communication server system 108, but to later migrate this technology and functionality to the communication client application 104 where a Client device 102 has a sufficient processing capacity.

The communication server system 108 supports various services and operations that are provided to the communication client application 104. Such operations include transmitting data to, receiving data from, and processing data generated by the communication client application 104. This data may include, message content, Client Device information, geolocation information, media annotation and overlays, message content persistence conditions, social network information, and live event information, as examples. Data exchanges within the communication system 100 are invoked and controlled through functions available via user interfaces (UIs) of the communication client application 104.

Turning now specifically to the communication server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the communication client application 104 in order to invoke functionality of the application server 112. The Application Program Interface (API) server 110 exposes various functions supported by the application server 112, including account registration, login functionality, the sending of messages, via the application server 112, from a particular communication client application 104 to another communication client application 104, the sending of media files (e.g., images or video) from a communication client application 104 to the communication server application 114, and for possible access by another communication client application 104, the setting of a collection of media data (e.g., story), the retrieval of a list of friends of a user of a Client device 102, the retrieval of such collections, the retrieval of messages and content, the adding and deletion of friends to a social graph, the location of friends within a social graph, and opening an application event (e.g., relating to the communication client application 104).

The application server 112 hosts a number of applications and subsystems, including a communication server application 114, an image processing system 116 and a social network system 122. The communication server application 114 implements a number of message processing technologies and functions, particularly related to the aggregation and other processing of content (e.g., textual and multimedia content) included in messages received from multiple instances of the communication client application 104. As will be described in further detail, the text and media content from multiple sources may be aggregated into collections of content (e.g., called stories or galleries). These collections are then made available, by the communication server application 114, to the communication client application 104. Other processor and memory intensive processing of data may also be performed server-side by the communication server application 114, in view of the hardware requirements for such processing.

The communication server application 114 also facilities virtual interaction sessions between users. In the context of a virtual interaction session, one or more users may establish a real-time communication link with a host user. To establish a real-time communication link between user 103-1 of client device 102-1 and user 103-2 of client device 102-2, the communication server application 114 causes client device 102-2 to display a live camera feed that depicts a real-world environment at the location of the user 103-1. In an example, the client device 102-1 is a wearable device (e.g., smart glasses) worn by the user 103-1 that includes a camera and optical elements that include a transparent display through which the real-world environment is visible to the user 103-1. While the active real-time communication link between the users 103-1 and 103-2 is active, the user 103-2 can view the real-world environment of the user 103-1 via the live camera feed generated by the camera of the client device 102-1 and displayed by the client device 102-2. The communication server application 114 also enables the users 103-1 and 103-2 verbally using an audio communication and augmented reality based communication modalities.

As an example, in addition to the live camera feed generated by the client device 102-1, the communication server application 114 may cause the client device 102-1 to display a set of selectable virtual content items that can be applied to the real-world environment that is visible to the user 103-1. Each virtual content item includes one or more media objects. In an example, a virtual content item selected by the user 103-2 can be applied to the real-world environment that is visible to the user 103-1 by causing one or more media objects to be displayed by the transparent display in the optical elements of the client device 102-1. In this way, the one or more media objects appear to the first user as though they exist in the real-world environment. Further details regarding virtual interaction sessions are discussed below.

The application server 112 also includes an image processing system 116 that is dedicated to performing various image processing operations, typically with respect to images or video generated and displayed by instances of the client device 102.

The social network system 122 supports various social networking functions services, and makes these functions and services available to the communication server application 114. To this end, the social network system 122 maintains and accesses an entity graph within the database 120. Examples of functions and services supported by the social network system 122 include the identification of other users of the communication system 100 with which a particular user has relationships or is "following", and also the identification of other entities and interests of a particular user.

The application server 112 is communicatively coupled to a database server 118, which facilitates access to a database 120 in which is stored data associated with messages processed by the communication server application 114.

Figure 2:
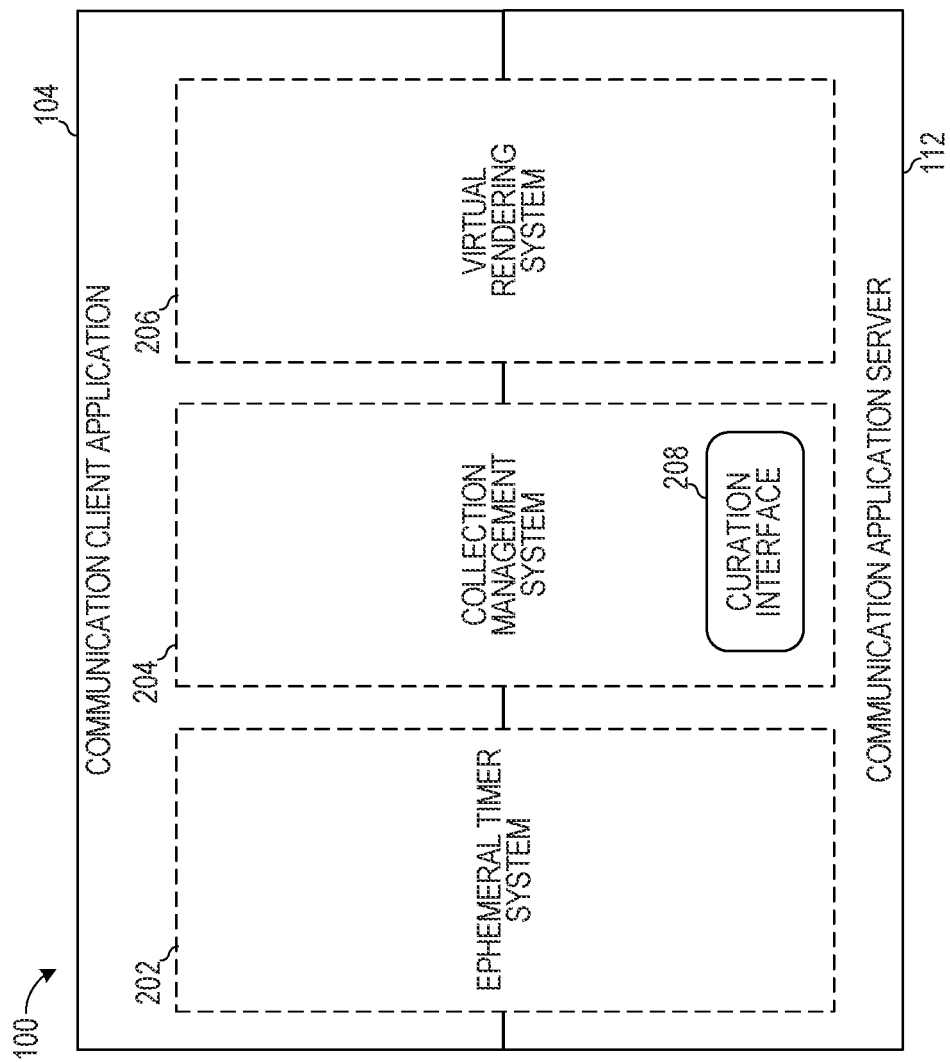
FIG. 2 is a diagrammatic representation of a communication system, in accordance with some example embodiments.

FIG. 2 is block diagram illustrating further details regarding the communication system 100, according to example embodiments. Specifically, the communication system 100 is shown to comprise the communication client application 104 and the application server 112, which in turn embody a number of subsystems, namely an ephemeral timer system 202, a collection management system 204, and a virtual rendering system 206.

The ephemeral timer system 202 is responsible for enforcing temporary access to content permitted by the client application 104 and the application server 112. To this end, the ephemeral timer system 202 incorporates a number of timers that, based on duration and display parameters associated with a message, or collection of messages (e.g., a story), selectively display and enable access to messages and associated content via the client application 104.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection.

The virtual rendering system 206 provides various functions that enable a user to augment or otherwise modify or edit media content (e.g., comprising image data and/or audio data). For example, the virtual rendering system 206 provides functions related to application of virtual content items to real-world environments whether through display of media objects on transparent displays through which a real-world environment is visible or through augmenting image data to include media objects overlaid on real-world environments depicted therein. The virtual content items may comprise one or more media objects. A media object may include audio and visual content and visual effects. Examples of audio and visual content include pictures, texts, logos, animations, and sound effects. The audio and visual content or the visual effects can be applied to a media data (e.g., a live image stream). The virtual content items may be stored in the database(s) 120 and accessed through the database server(s) 132.

Figure 3:
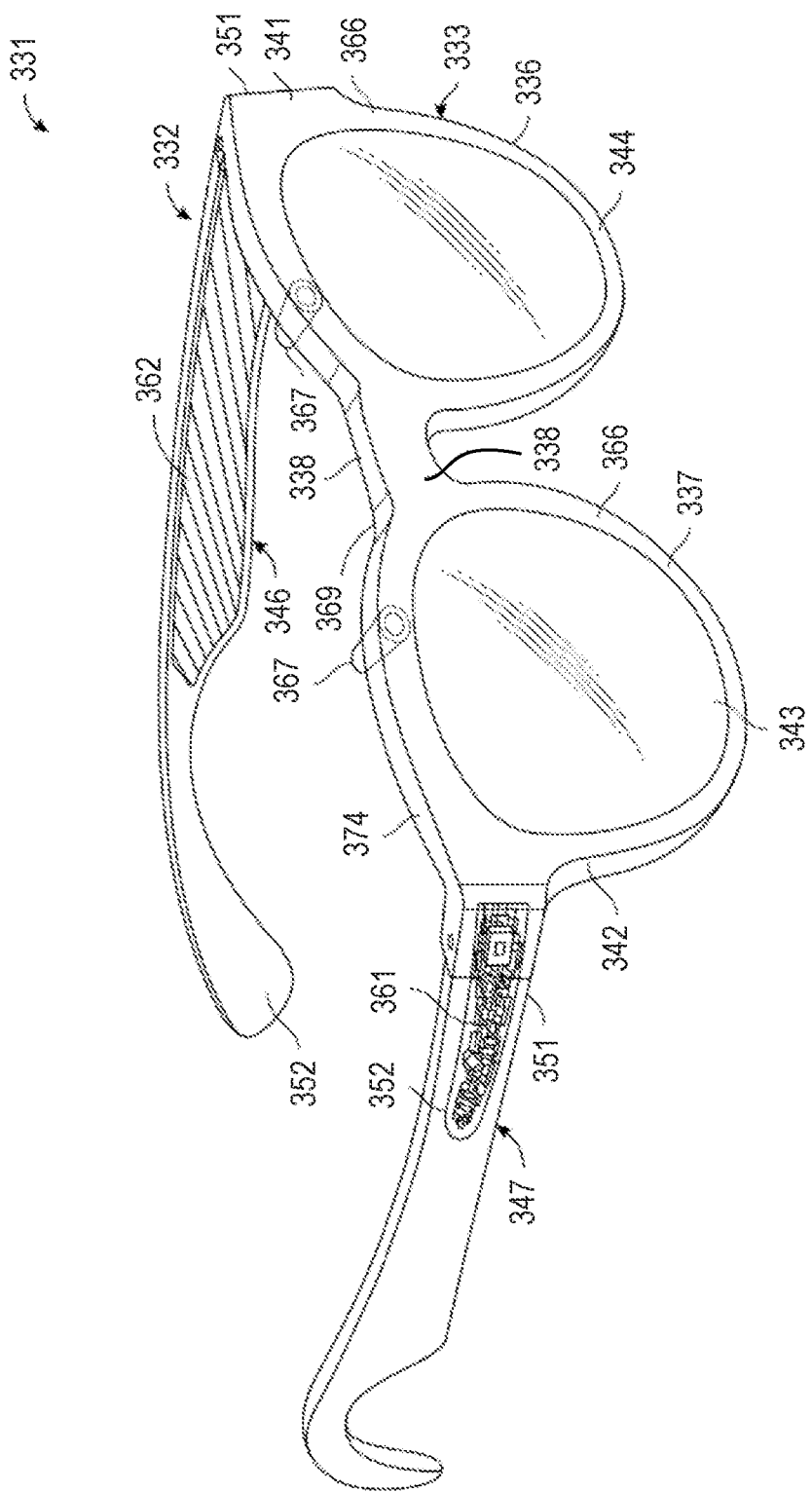
FIG. 3 is a diagram illustrating a wearable device for use in a virtual interaction session, according to some example embodiments.

FIG. 3 is a diagram illustrating a wearable device in the example form of glasses 331 for use in an virtual interaction session, according to some example embodiments. The glasses 331 can include a frame 332 made from any suitable material such as plastic or metal, including any suitable shape memory alloy. The frame 332 can have a front piece 333 that can include a first or left lens, display, or optical element holder 336 and a second or right lens, display, or optical element holder 337 connected by a bridge 338. The front piece 333 additionally includes a left end portion 341 and a right end portion 342. A first or left optical element 344 and a second or right optical element 343 can be provided within respective left and right optical element holders 336, 337. Each of the optical elements 343, 344 can be a lens, a display (e.g., a transparent display or a video display), a display assembly, or a combination of the foregoing. In some embodiments, for example, the glasses 331 are provided with an integrated near-eye display mechanism that enables, for example, display to the user of preview images for visual media captured by cameras 367 of the glasses 331. In some embodiments, integrated near-eye display mechanism allows for display of a media object such that the media object is overlaid on a real-world environment that is viewable through the optical elements 343 and 344.

The frame 332 additionally includes a left arm or temple piece 346 and a right arm or temple piece 347 coupled to the respective left and right end portions 341, 342 of the front piece 333 by any suitable means, such as a hinge (not shown), so as to be coupled to the front piece 333, or rigidly or fixably secured to the front piece 333 so as to be integral with the front piece 333. Each of the temple pieces 346 and 347 can include a first portion 351 that is coupled to the respective end portion 341 or 342 of the front piece 333 and any suitable second portion 352, such as a curved or arcuate piece, for coupling to the ear of the user. In one embodiment, the front piece 333 can be formed from a single piece of material, so as to have a unitary or integral construction. In one embodiment, the entire frame 332 can be formed from a single piece of material so as to have a unitary or integral construction.

The glasses 331 can include a device, such as a computer 361, which can be of any suitable type so as to be carried by the frame 332 and, in one embodiment, of a suitable size and shape so as to be at least partially disposed in one of the temple pieces 346 and 347. In one embodiment, the computer 361 has a size and shape similar to the size and shape of one of the temple pieces 346, 347 and is thus disposed almost entirely if not entirely within the structure and confines of such temple pieces 346 and 347. In one embodiment, the computer 361 can be disposed in both of the temple pieces 346, 347. The computer 361 can include one or more processors with memory, wireless communication circuitry, and a power source. The computer 361 comprises low-power circuitry, high-speed circuitry, and a display processor. Various other embodiments may include these elements in different configurations or integrated together in different ways.

The computer 361 additionally includes a battery 362 or other suitable portable power supply. In one embodiment, the battery 362 is disposed in one of the temple pieces 346 or 347. In the glasses 331 shown in FIG. 3, the battery 362 is shown as being disposed in the left temple piece 346 and electrically coupled using a connection 374 to the remainder of the computer 361 disposed in the right temple piece 347. One or more I/O devices can include a connector or port (not shown) suitable for charging a battery 362 accessible from the outside of the frame 332, a wireless receiver, transmitter, or transceiver (not shown), or a combination of such devices. Given the limited size of the glasses 331 and the computer 361, resource-intensive operations such as video streaming can quickly drain the battery 362 and can be a strain on the one or more processors of the computer 361 that can lead to overheating.

The glasses 331 include digital cameras 367. Although two cameras 367 are depicted, other embodiments contemplate the use of a single or additional (i.e., more than two) cameras. For ease of description, various features relating to the cameras 367 will further be described with reference to only a single camera 367, but it will be appreciated that these features can apply, in suitable embodiments, to both cameras 367.

Consistent with some embodiments, the glasses 331 are an example instance of the client device 102 and may be worn by the user 103-1. Further, in these embodiments, the user 103-2 can view a live camera feed generated by the camera 367 and interact with the user 103-2 by causing virtual content items added to a real-world environment that is visible to the user 103-1 via the glasses 331. That is, one or more media objects corresponding to a virtual content item selected by the user 103-2 can be displayed by the integrated near-eye display mechanism that enables such that the media object is overlaid on a real-world environment that is viewable through the optical elements 343 and 344.

In various embodiments, the glasses 331 may include any number of input sensors or peripheral devices in addition to the cameras 367. The front piece 333 is provided with an outward-facing, forward-facing, front, or outer surface 366 that faces forward or away from the user when the glasses 331 are mounted on the face of the user, and an opposite inward-facing, rearward-facing, rear, or inner surface 369 that faces the face of the user (e.g., user 103-1) when the glasses 331 are mounted on the face of the user. Such sensors can include inward-facing video sensors or digital imaging modules such as cameras that can be mounted on or provided within the inner surface 369 of the front piece 333 or elsewhere on the frame 332 so as to be facing the user, and outward-facing video sensors or digital imaging modules such as the cameras 367 that can be mounted on or provided with the outer surface 366 of the front piece 333 or elsewhere on the frame 332 so as to be facing away from the user. Such sensors, peripheral devices, or peripherals can additionally include biometric sensors, location sensors, accelerometers, or any other such sensors.

The glasses 331 further include an example embodiment of a camera control mechanism or user input mechanism comprising a camera control button mounted on the frame 332 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 332 adjacent to its surface for detecting the presence of a user's finger to dispose the touch-sensitive button to the engaged condition when the user touches a finger to the corresponding spot on the outer surface of the frame 332. It will be appreciated that the above-described camera control button and capacitive touch button are but two examples of a haptic input mechanism for single-action control of the camera 367 and that other embodiments may employ different single-action haptic control arrangements.

Figure 4:
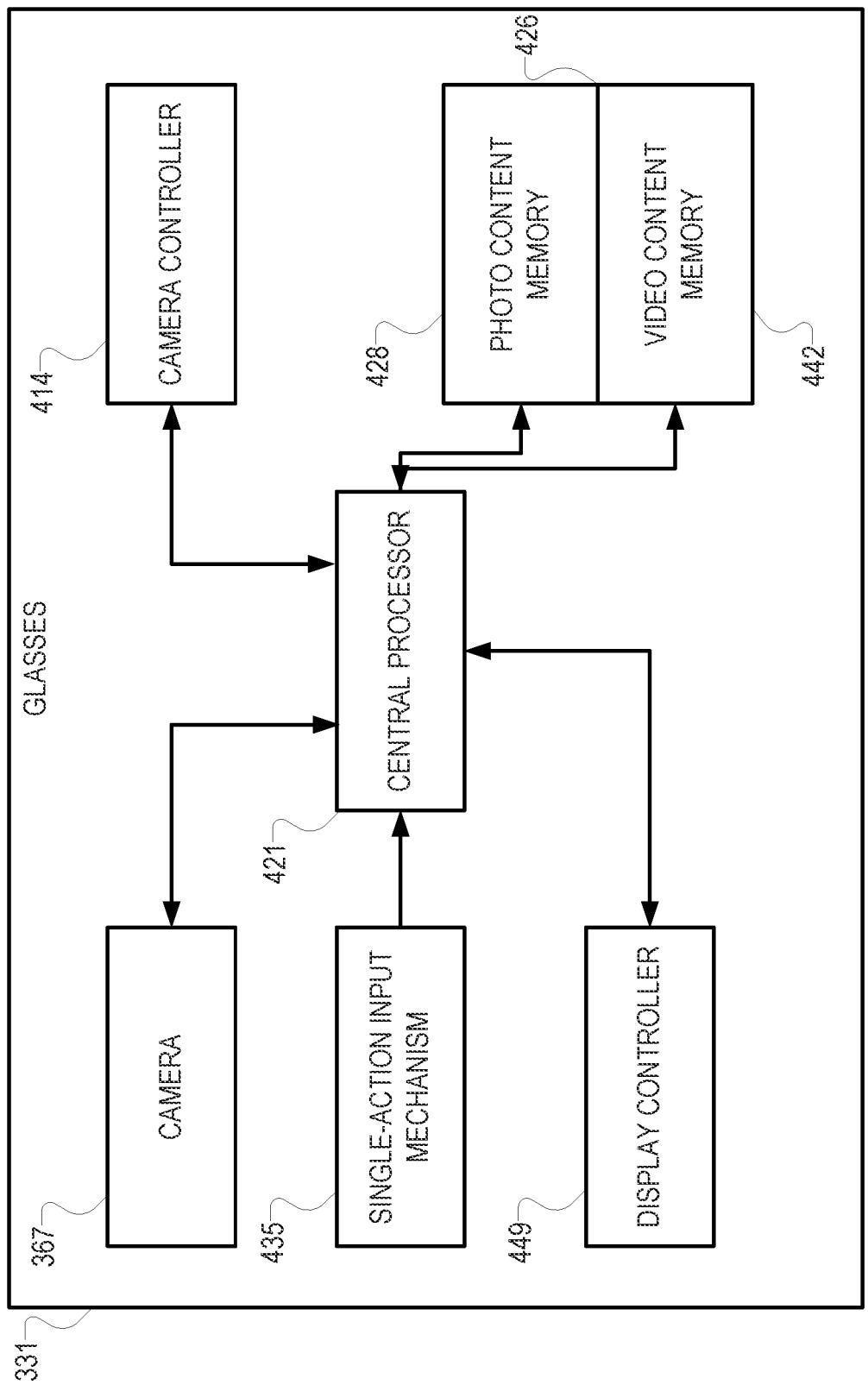
FIG. 4 is a block diagram illustrating aspects of the wearable device, according to some example embodiments.

FIG. 4 is a block diagram illustrating aspects of the wearable device in the example form of the glasses 331, according to some example embodiments. The computer 361 of the glasses 331 includes a central processor 421 in communication with an onboard memory 426. The central processor 421 may be a CPU and/or a graphics processing unit (GPU). The memory 426 in this example embodiment comprises a combination of flash memory and random-access memory.

The glasses 331 further include a camera controller 414 in communication with the central processor 421 and the camera 367. The camera controller 414 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 367 and on-board processing of the image data prior to persistent storage thereof and/or to presentation thereof to the user for viewing or previewing.

In some embodiments, the camera controller 414 comprises permanently configured circuitry, such as firmware or an application-specific integrated circuit (ASIC) configured to perform the various functions described herein. In other embodiments, the camera controller 414 may comprise a dynamically reconfigurable processor executing instructions that temporarily configure the processor to execute the various functions described herein.

The camera controller 414 interacts with the memory 426 to store, organize, and present image content in the form of photo content and video content. To this end, the memory 426 in this example embodiment comprises a photo content memory 428 and a video content memory 442. The camera controller 414 is thus, in cooperation with the central processor 421, configured to receive from the camera 367 image data representative of digital images produced by the camera 367 in accordance with some of the image-capture parameters, to process the image data in accordance with some of the image-capture parameters, and to store the processed image data in an appropriate one of the photo content memory 428 and the video content memory 442.

The camera controller 414 is further configured to cooperate with a display controller 449 to cause display on a display mechanism incorporated in the glasses 331 of selected photos and videos in the memory 426 and thus to provide previews of captured photos and videos. In some embodiments, the camera controller 414 will manage processing of images captured using automatic bracketing parameters for inclusion in a video file.

A single-action input mechanism 435 is communicatively coupled to the central processor 421 and the camera controller 414 to communicate signals representative of a current state of the camera control button and thereby to communicate to the camera controller 414 whether or not the camera control button is currently being pressed. The camera controller 414 further communicates with the central processor 421 regarding the input signals received from the single-action input mechanism 435. In one embodiment, the camera controller 414 is configured to process input signals received via the single-action input mechanism 435 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 414 automatically to apply relatively less rigorous video processing to captured video content prior to persistent storage and display thereof. Conversely, pressing of the camera control button for shorter than the threshold duration in such an embodiment causes the camera controller 414 automatically to apply relatively more rigorous photo stabilization processing to image data representative of one or more still images.

The glasses 331 may be a stand-alone client device that is capable of independent operation or may be a companion device that works with a primary device to offload intensive processing and/or exchange data over the network 106 with the communication server system 108. The glasses 331 may further include various components common to mobile electronic devices such as smart glasses or smart phones (for example, including a display controller for controlling display of visual media (including photographic and video content captured by the camera 367) on a display mechanism incorporated in the device). Note that the schematic diagram of FIG. 4 is not an exhaustive representation of all components forming part of the glasses 331.

FIGS. 5A-5H are conceptual diagrams illustrating a flow of an example virtual interaction session between a first user (e.g., the user 103-1) and at a second user (e.g., the user 103-2), according to some example embodiments. In the context of a virtual interaction session, one or more users can establish a real-time communication link with the first user based on the first user permitting and inviting the one or more users to establish the real-time communication link. When a real-time communication link is established between the first user and the second user, the second user is able to view a live camera feed (e.g., comprising a real-time image data) generated by the first user's device—device 500 (referred to herein and in FIGS. 5A-5H as the "first device"; e.g., the client device 102-1) on a display of their own device—device 502 (referred to herein and in FIGS. 5A-5H as the "second device"; e.g., client device 102-2) while also interacting with the first user using verbal and augmented reality based communication modalities.

In the example embodiments discussed below, the first device is a wearable device (e.g., glasses 331) with an embedded camera and optical elements that include a display (e.g., a transparent display). Accordingly, FIGS. 5A-5H are discussed below with reference to such a wearable device. However, while the examples described below may refer to embodiments in which information is presented by the display of the first device, it shall be appreciated that such information may in the alternative or in addition be presented by a primary device that is coupled to a wearable device. The wearable device may be a stand-alone device that is capable of independent operation or may be a companion device that works with a primary device to offload intensive processing Consistent with these embodiments, the second user may utilize a client application (e.g., client application 104) executing on the second device to view a live camera feed generated by the first device while interacting with the first user. Similarly, the first user may utilize a client application (e.g., client application 104) executing on the first device to configure and initiate the virtual interaction session.

Figure 5A:
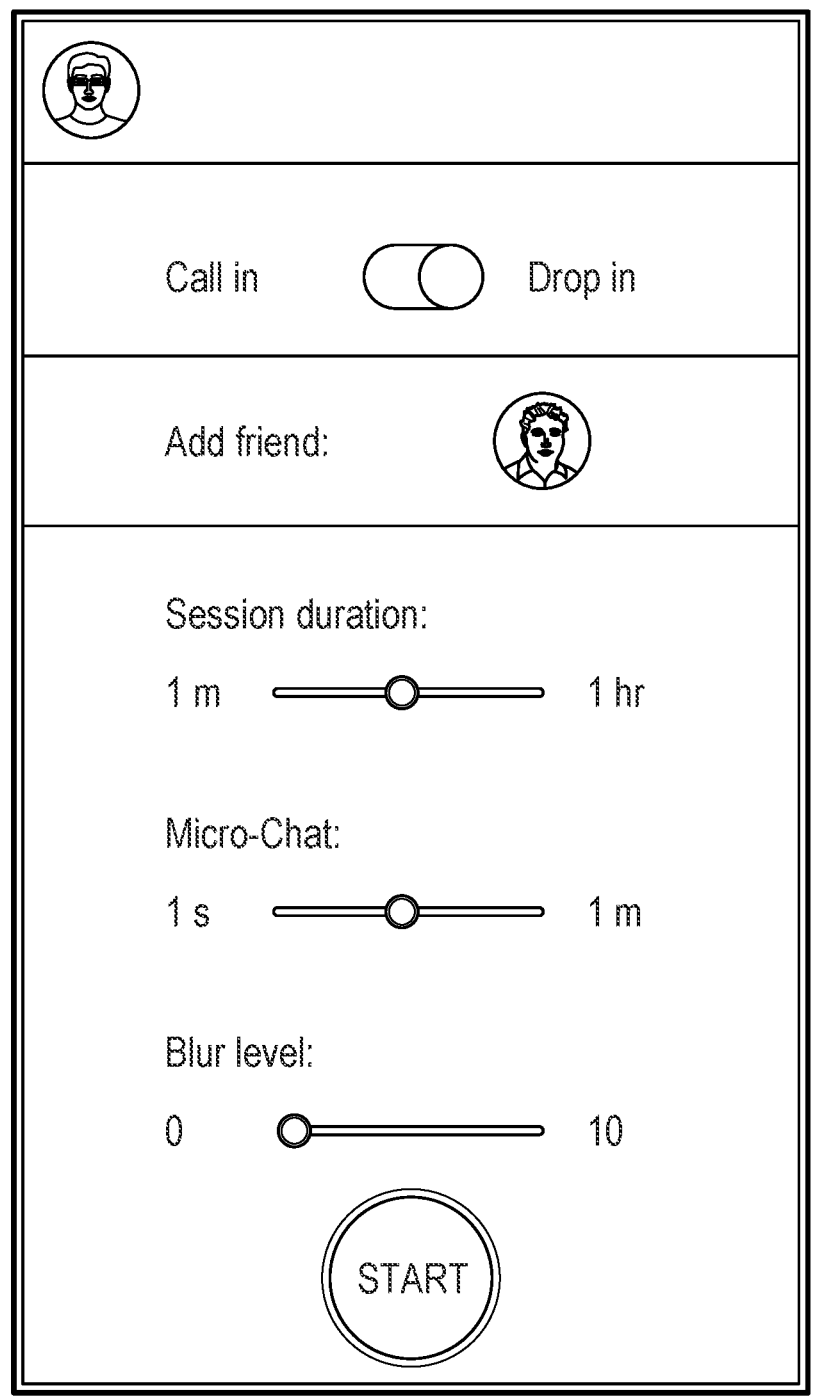
FIGS. 5A-5H are conceptual diagrams illustrating a flow of an example virtual interaction session between a first and second user, according to some example embodiments.

With reference to FIG. 5A a session configuration interface 504 displayed by the first device is shown. The session configuration interface 504 allows the first user to configuration session parameters for a virtual interaction session. To this end, the session configuration interface includes multiple interface elements that the first user can use to input the configuration parameters.

As shown, the first user may specify configuration parameters such as identifiers that correspond to users who are permitted to join the virtual interaction session, whether the first user is to approve of a real-time communication link before it is established ("Call in" versus "Drop in"), a session duration, a micro-chat duration, and a blur level. The session duration defines a time limit of the virtual interaction session and the micro-chat duration defines a time limit for real-time communication links established during the virtual interaction session. There can be multiple micro-chat sessions within a virtual interactive session. A real-time communication link with a time limit may be referred to herein as a "time limited real-time communication link" or simply as "micro-chat."

Session configuration data that includes the one or more configuration parameters specified by the first user via the session configuration interface 504 is provided to an application server (e.g., application server 112). In response to receiving the session configuration information, the application server initiates the virtual interaction session with the first user. In initiating the virtual interaction session, the application server provides the second device with an indicator of the virtual interaction session with the first user for display. The indicator may include an interactive element that allows the second user to the join the virtual interaction session by establishing a real-time communication link with the first user. For example, the indicator can include a button that, when selected by the second user, triggers transmission of a request to join the virtual interaction session. More specifically, the request may include a request to establish a real-time communication link between the first and second user.

In some embodiments, the indicator may be displayed within a feed of available virtual interaction sessions or a similar user interface element provided by the client application executing on the second device. In some embodiments, the indicator may be provided for display on the second device as a notification, pop-up, or other such user interface element.

The application server provides the indicator for display at the second device until expiration of the session duration. Accordingly, upon initiating the virtual interaction session the application server initiates a timer to measure elapsed time and compares the elapsed time to the session duration. Expiration of the session duration occurs when the elapsed time reaches the session duration.

Figure 5B:
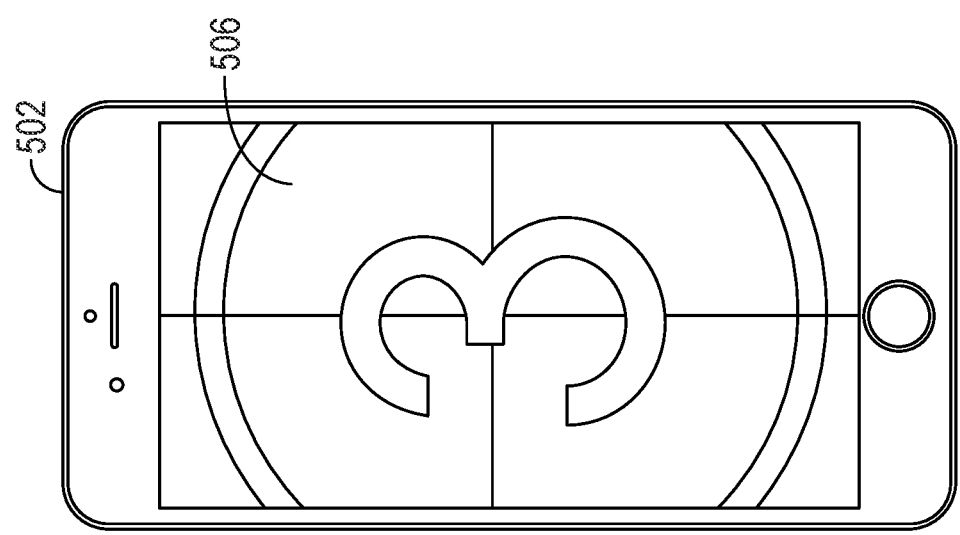
Figure 5B:
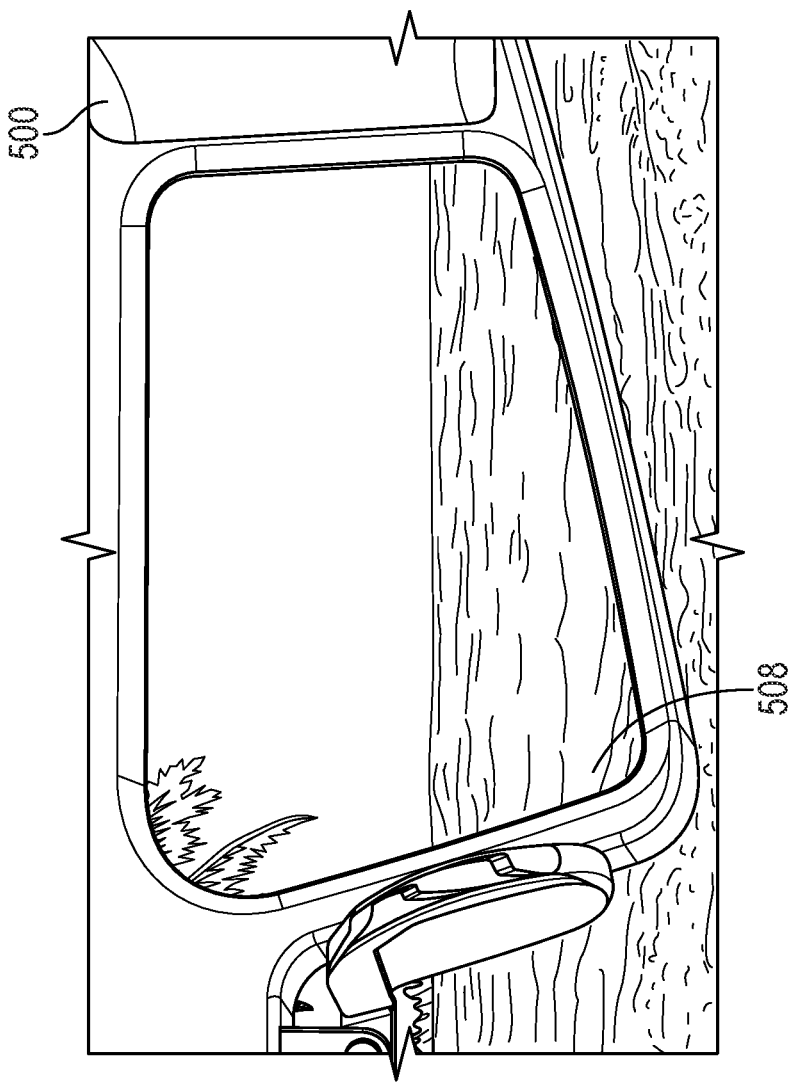

Based on receiving a request from the second device to establish a real-time communication link between the first and second user, the application server may cause display of an indication on the first device and/or second device that the real-time communication link is set to begin. For example, as shown in FIG. 5B, a countdown timer 506 is displayed on the second device (device 502) to inform the second user of the forthcoming real-time communication link with the first user. While FIG. 5B only illustrates the indication being provided for display on the second device, it shall be appreciated that in other examples, the indication is also provided to the first device (device 500).

Figure 5C:
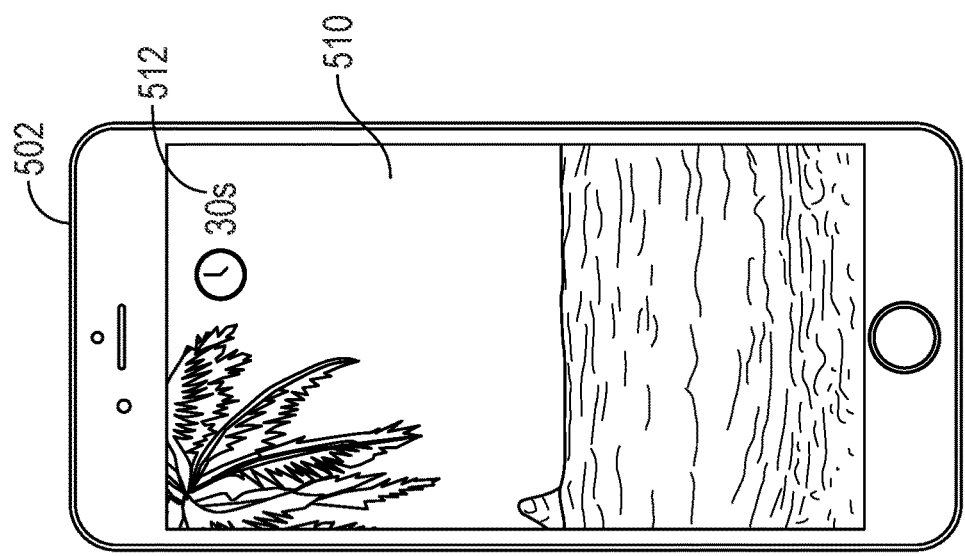
Figure 5C:
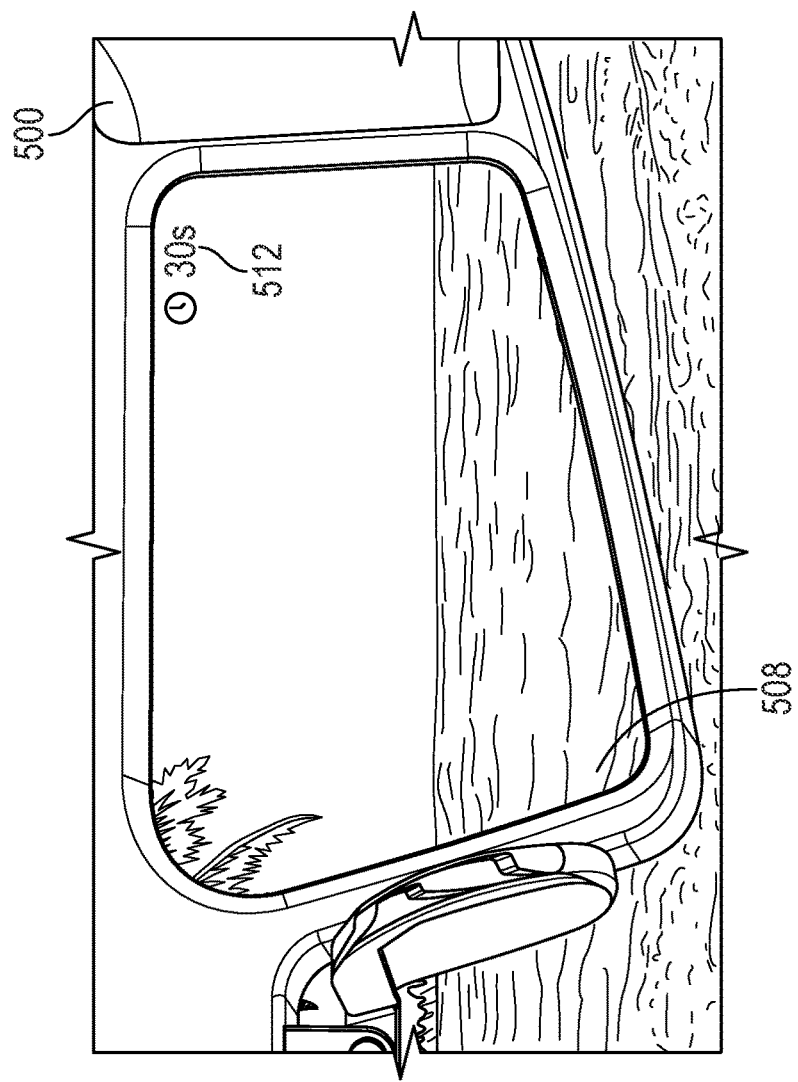

With continued reference to FIG. 5B, a real-world environment 508 is visible to the first user via the optical elements of the first device. As shown in FIG. 5C, as part of establishing the real-time communication link between the first and second user, the application server enables the second user to view the real-world environment 508 by causing display of a live camera feed 510 generated by the first device on the second device. As shown, the live camera feed 510 depicts the real-world environment 508. Further, as shown, the application server causes display of a countdown timer 512 on both the first and second devices to provide an indicator of the remaining time in the real-time communication link. In this example, the countdown timer 512 provides a measure of time remaining in the real-time communication link until expiration of the micro-chat duration. In other example embodiments, the countdown timer 512 may correspond to the time remaining in the virtual interaction session.

Figure 5D:
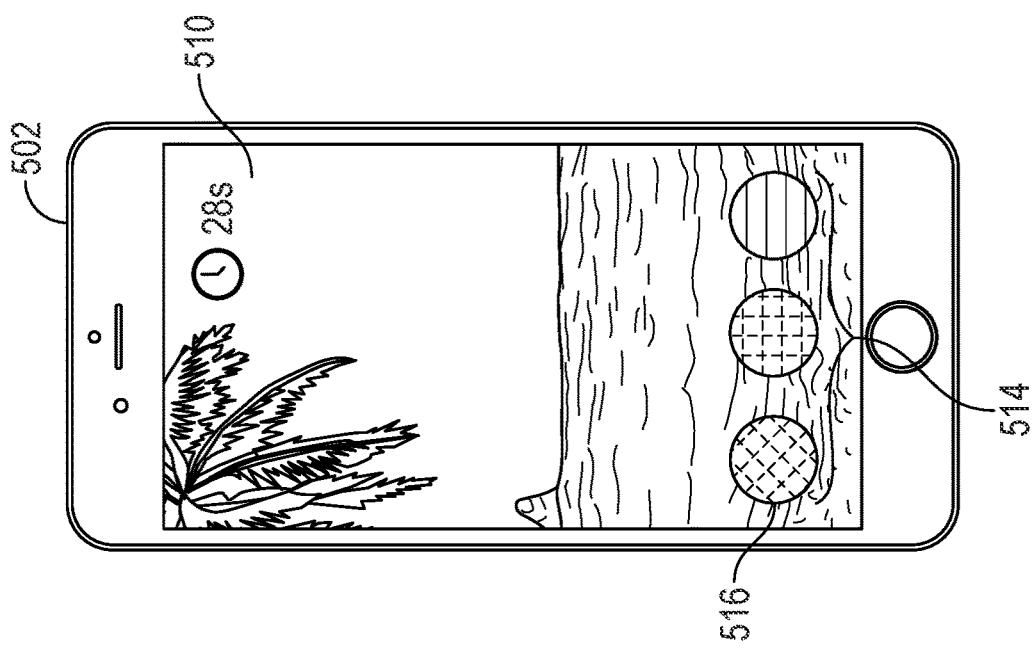
Figure 5D:
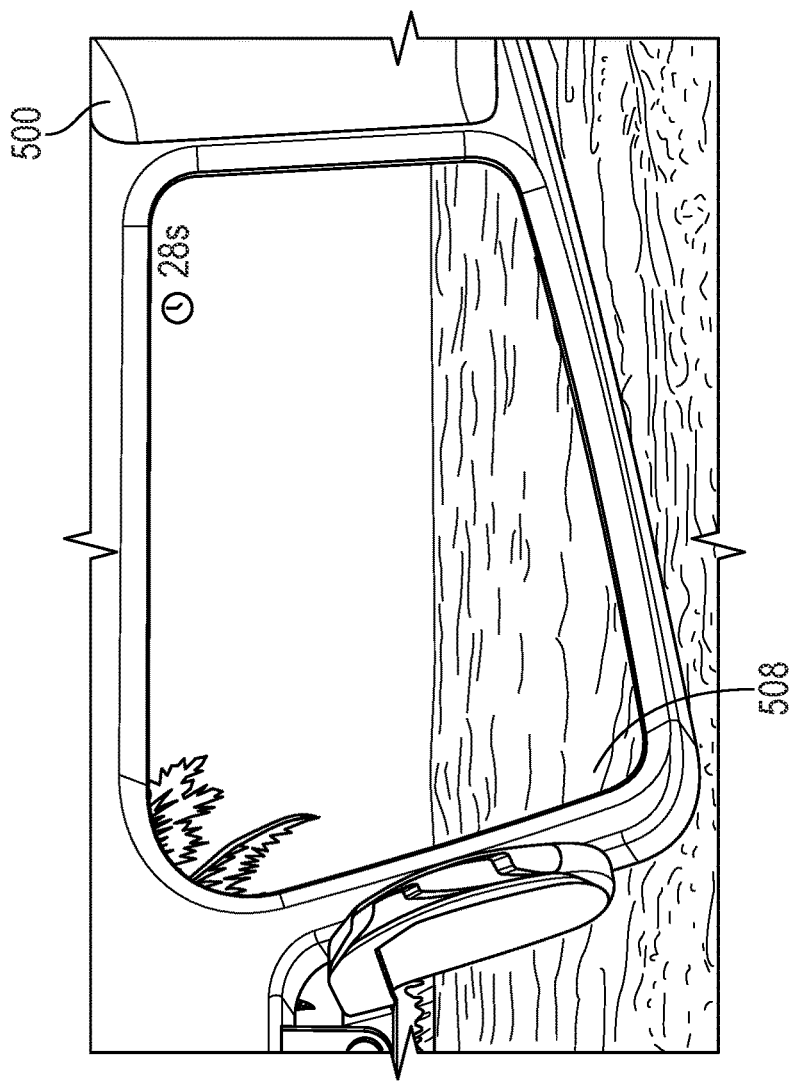

As noted above, while a real-time communication link is established between the first and second user, the second user can control what is presented to the first user via the display of the first device. More specifically, the second user can view the real-world environment 508 that is visible to the first user and interact with the first user via augmented reality as well as verbal modalities. To this end, the application server enables an audio communication link between the first and second devices that allow the first and second user to communicate verbally, and as shown in FIG. 5D, the application server also causes display on the second device of a set of selectable virtual content items 514 to transmit to the first device and apply to the real-world environment 508 that is visible to the first user. Each virtual content item includes one or more media objects (two or three dimensional) that are to be overlaid on a view of the real-world environment 508 that is visible to the first user via the first device.

Figure 5E:
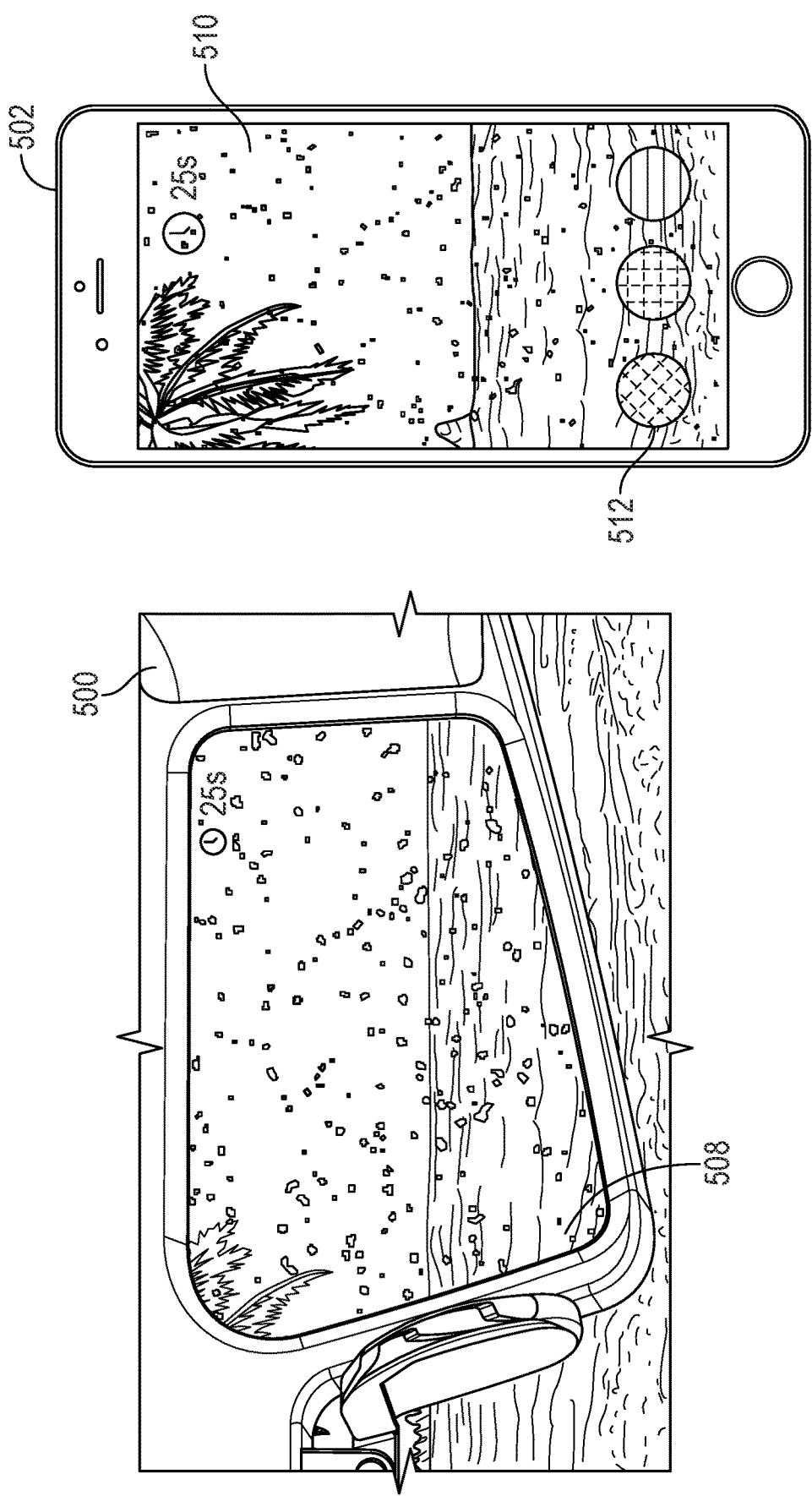

As shown in FIG. 5E, based on the second user selecting virtual content item 516 from the set of selectable virtual content items 514, the application server causes display, at both the first and second device, of one or more media objects overlaid on the real-world environment 508. In the particular example illustrated in FIG. 5E, the virtual content item includes falling snow and the application of the virtual content item to the real-world environment 508 makes it appear to the first user that it is snowing at the location of the first user.

In embodiments in which the real-world environment 508 is visible to a user via a transparent display such as with the first device in this example, the application server applies the virtual content item to the real-world environment 508 by causing the transparent display to display the one or more media objects. In embodiments in which the real-world environment 508 is presented to a user via a live camera feed such as with the second device in this example, the application server applies the virtual content item to the real-world environment 508 by augmenting image data from the live camera feed 510 generated by the first device to include the one or more media objects overlaid on the real-world environment 508.

Figure 5F:
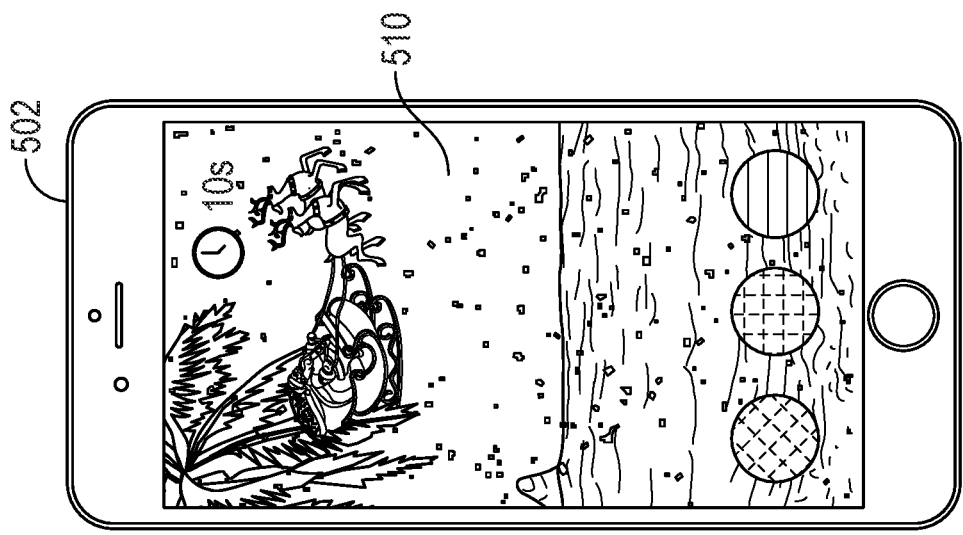
Figure 5F:
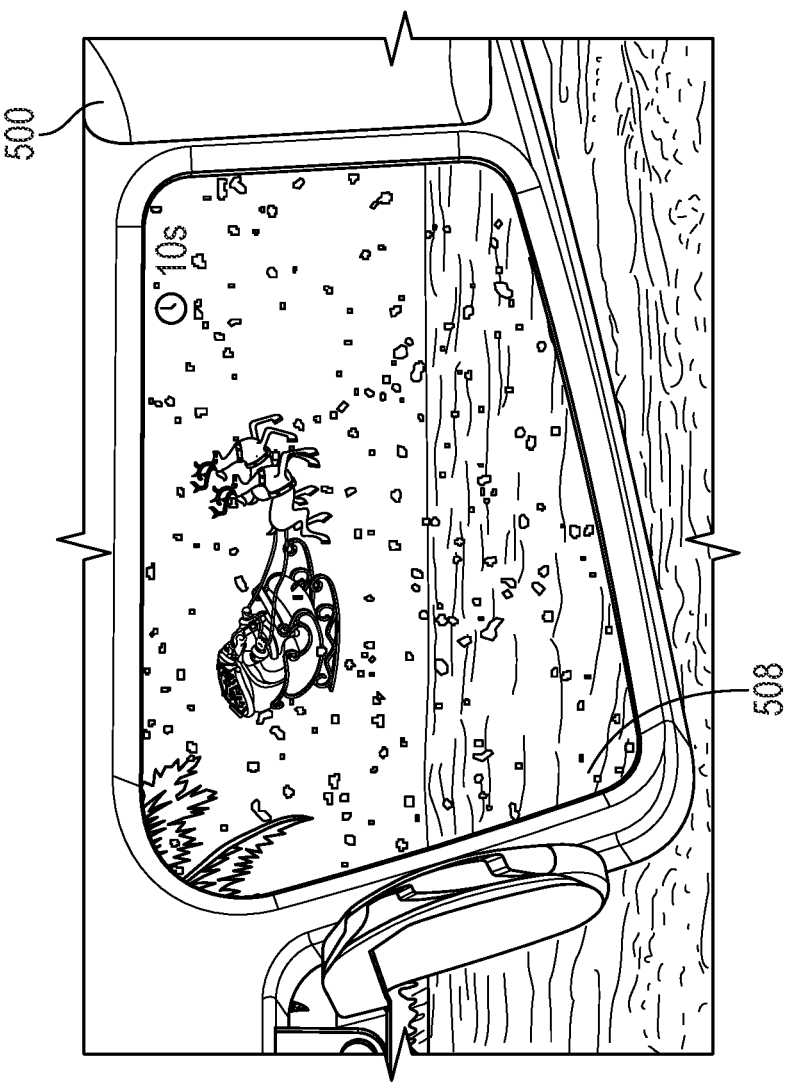

As shown in FIG. 5F, while the real-time communication link between the first and second user remains active, the second user may continue to select virtual content items to apply to the real-world environment 508 that is visible to the first user via the optical elements of the first device. In the example illustrated in FIG. 5F, the second user selected a second virtual content item that includes Santa in a sleigh being pulled by reindeer, and in response to the selection, the application server applies the second virtual content item to the real-world environment 508 that is visible to the first user along with the first virtual content item.

Figure 5G:
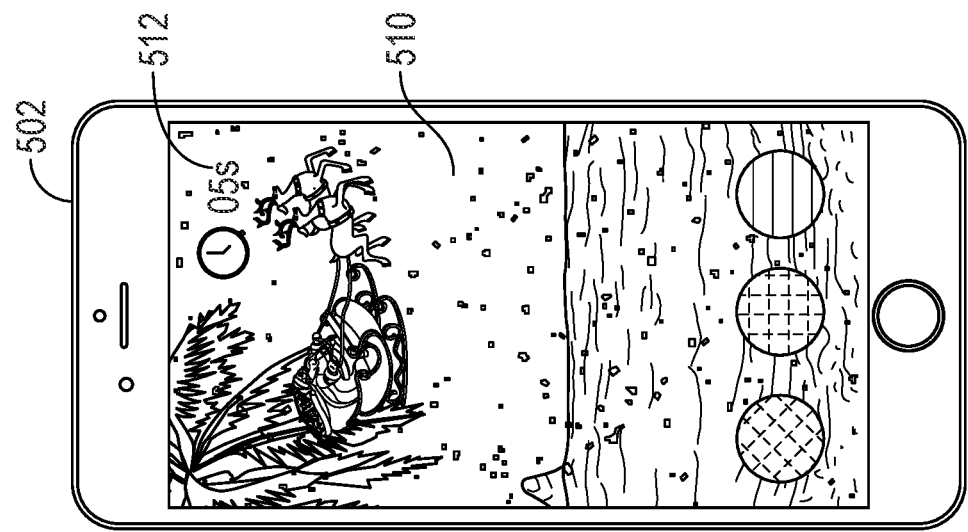
Figure 5G:
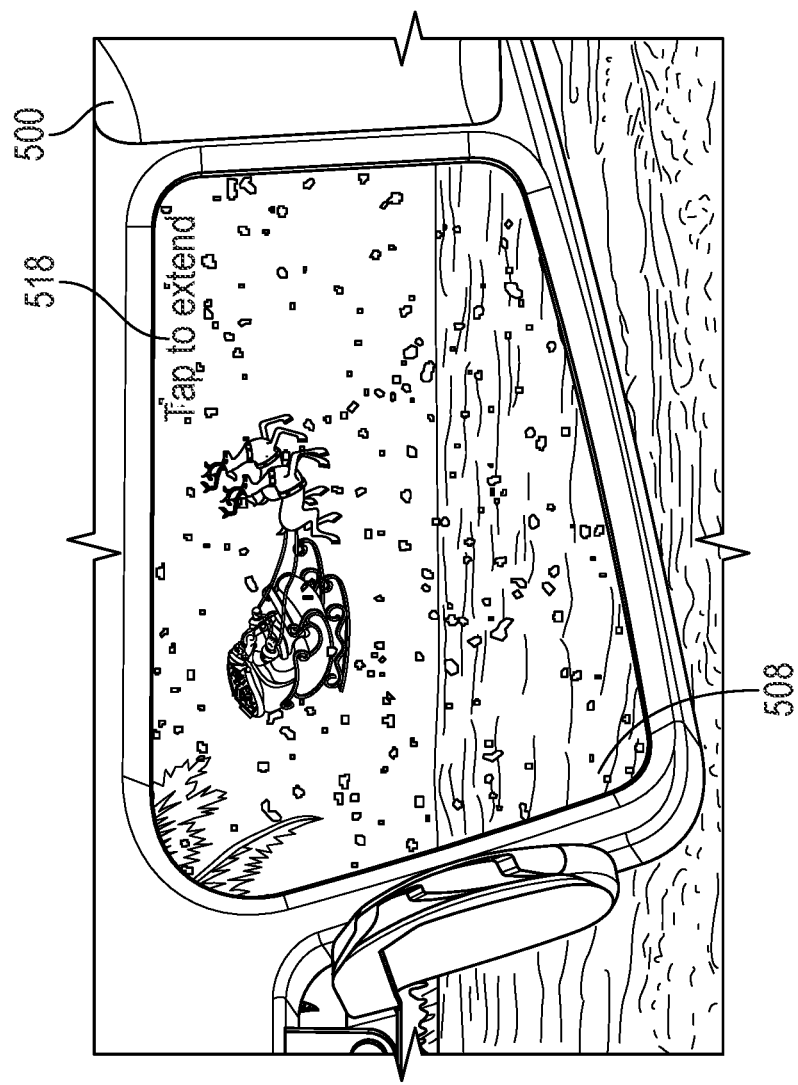

As shown in FIG. 5G, prior to expiration of the micro-chat duration, the application server may provide the first user an ability to extend the time limit on the real-time communication link by causing display of a notification 518 that includes an interactive element that the first user can use to trigger extension of the time limit.

Figure 5H:
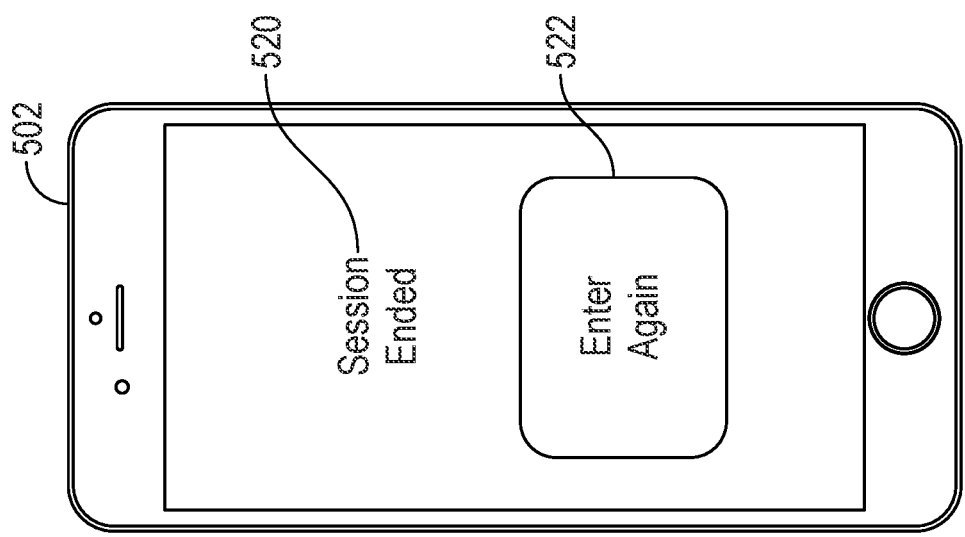
Figure 5H:
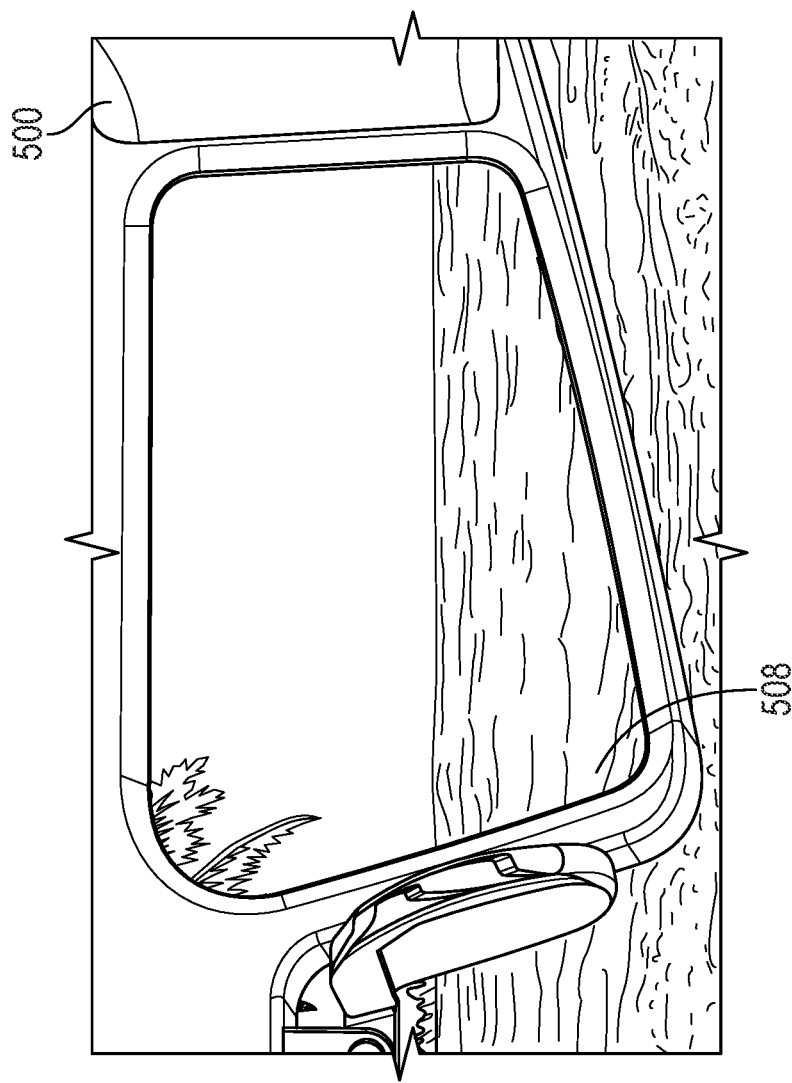

If the first user does not extend the time limit, the countdown timer 506 will continue and at the expiration of the micro-chat duration, the application server terminates the real-time link between the first and second user, as shown in FIG. 5H. In terminating the real-time link between the first and second user, the application server terminates the display of the live camera feed 510 on the second device and disables the audio communication link between the first and second device. Further, as shown in FIG. 5H, the application server may further cause display of an indication 520 on the second device that the real-time communication link has been terminated and may further display an interactive element 522 that allows the second user to trigger transmission of a request for an additional real-time communication link with the first user.

Figure 6A:
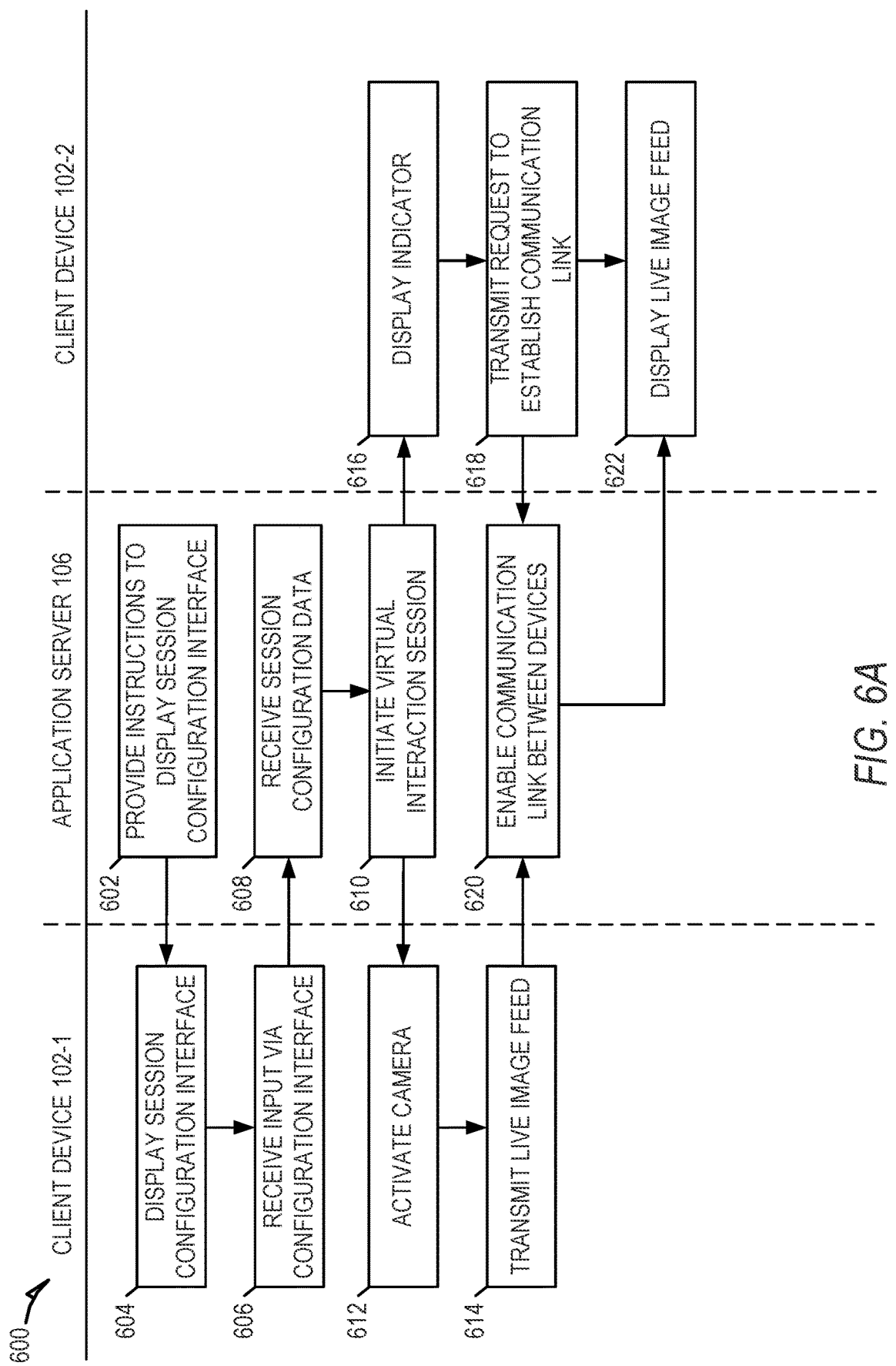
FIGS. 6A and 6B are interaction diagrams illustrating example interactions between components of the communication system in performing a method for facilitating a virtual interaction session with a first user, according to example embodiments.
Figure 6B:
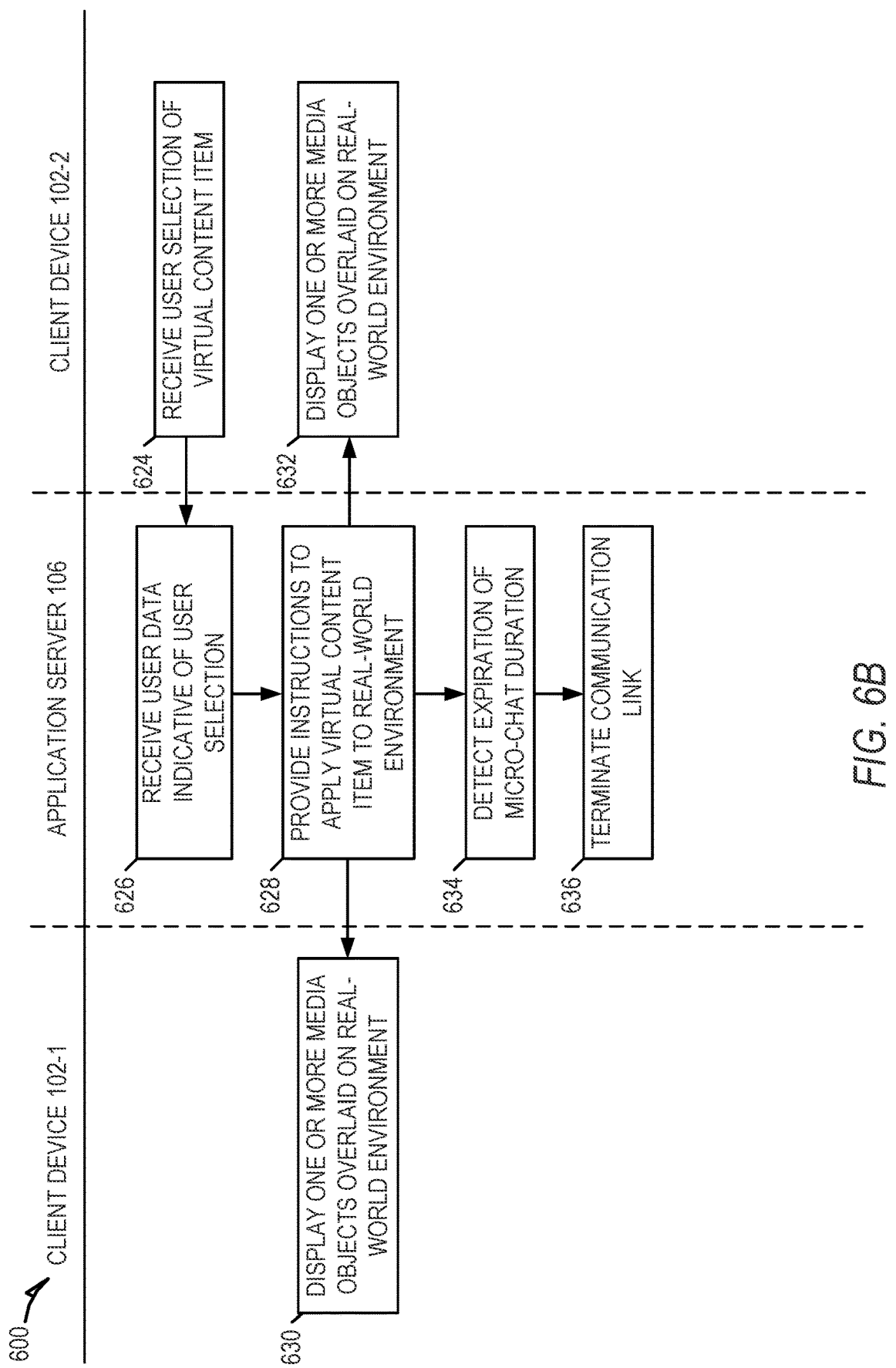

FIGS. 6A and 6B are interaction diagrams illustrating example interactions between a first device (client device 102-1), a second device (client device 102-2), and a server (application server 112) of the communication system in performing a method 600 for facilitating a virtual interaction session between a first user associated with the first device and a second user associated with the second device, according to example embodiments.

As shown in FIG. 6A, the method 600 begins at operation 602 where the application server 112 provides instructions to the client device 102-1 to display a session configuration interface (e.g., the session configuration interface 504). The client device 102-1 displays the session configuration interface, at operation 604, and receives input via the session configuration interface, at operation 606. The input defines one or more configuration parameters for a virtual interaction session with the first user. For example, the input may specify a micro-chat duration that defines a time limit for a real-time communication link between the client devices 110-1 and 110-2. The client device 102-1 provides configuration data comprising the one or more configuration parameters to the application server 112, which is received at operation 608.

In response to receiving the session configuration data, the application server 112 initiates the virtual interaction session with the first user, at operation 610. In initiating the virtual interaction session, the application server 112 triggers activation of an embedded camera of the client device 102-1 (operation 612) and causes the client device 102-1 to transmit a live camera feed generated by the camera back to the application server 112 (operation 614). Based on the session configuration data indicating that the first user has permitted the second user to join the virtual interaction session, the application server 112 also causes display of an indicator of the virtual interaction session by the client device 102-2, at operation 616. The indicator is provided to the client device 102-2 for display for the session duration and allows the second user to join the virtual interaction session by transmitting a request to establish a real-time communication link between the client devices 110-1 and 110-2 (operation 618).

Based on receiving a request to establish the real-time communication link between the client devices 110-1 and 110-2, the application server 112 enables the real-time communication link between the client device 102-1 and 110-2, at operation 620. In establishing the real-time communication link, the application server 112 enables an audio communication link between the devices that allows the users 106-1 and 106-2 to verbally communicate in real-time. The application server 112 also causes the client device 102-2 to display the live camera feed provided by the client device 102-1 (at operation 622) thereby allowing the user 103-2 to view the real-world environment at the location of the user 103-1 and control presentation of virtual content items to the user. For example, the live camera feed may be displayed on the client device 102-2 as part of a user interface that includes a set of selectable virtual content items that can be applied to the real-world environment that is visible to the user 103-1 via the client device 102-1.

As shown in FIG. 6B, at operation 624, a user selection of a virtual content item is received at the client device 102-2 and input data indicative of the user selection is provided by the client device 102-2 to the application server 112, which is received at operation 626.

Based on receiving the input data, the application server 112, at operation 628, provides instructions to the client devices 110-1 and 110-2 that causes the client devices 110-1 and 110-2 to display the virtual content item overlaid on the real-world environment that is visible to the user 103-1, at operations 630 and 632, respectively. The instructions provided to the client device 102-1 cause the client device 102-1 to display the virtual content item on a display (e.g., embedded in glasses 331) from which the real-world environment is visible. In embodiments in which the display is a transparent display, the instructions cause the client device 102-1 to display the virtual content item and because the display is transparent the virtual content item appears overlaid on the real-world environment. In embodiments in which the display is a non-transparent video display, the cause the client device 102-1 to augment a live camera feed presented to the user to include the virtual content item overlaid on the real-world environment. The instructions provided to the client device 102-2 cause the client device to augment the live camera feed to include the virtual content item overlaid on the real-world environment.

At operation 634, the application server 112 detects expiration of the micro-chat duration specified in the session configuration data. Based on detecting expiration of the micro-chat duration, the application server 112 terminates the real-time communication link between the client device 102-1 and 110-2, at operation 636. In terminating the real-time communication link, the application server 112 terminates the display of the live camera feed on the client device 102-2 and disables the audio communication link between the devices.

Figure 7:
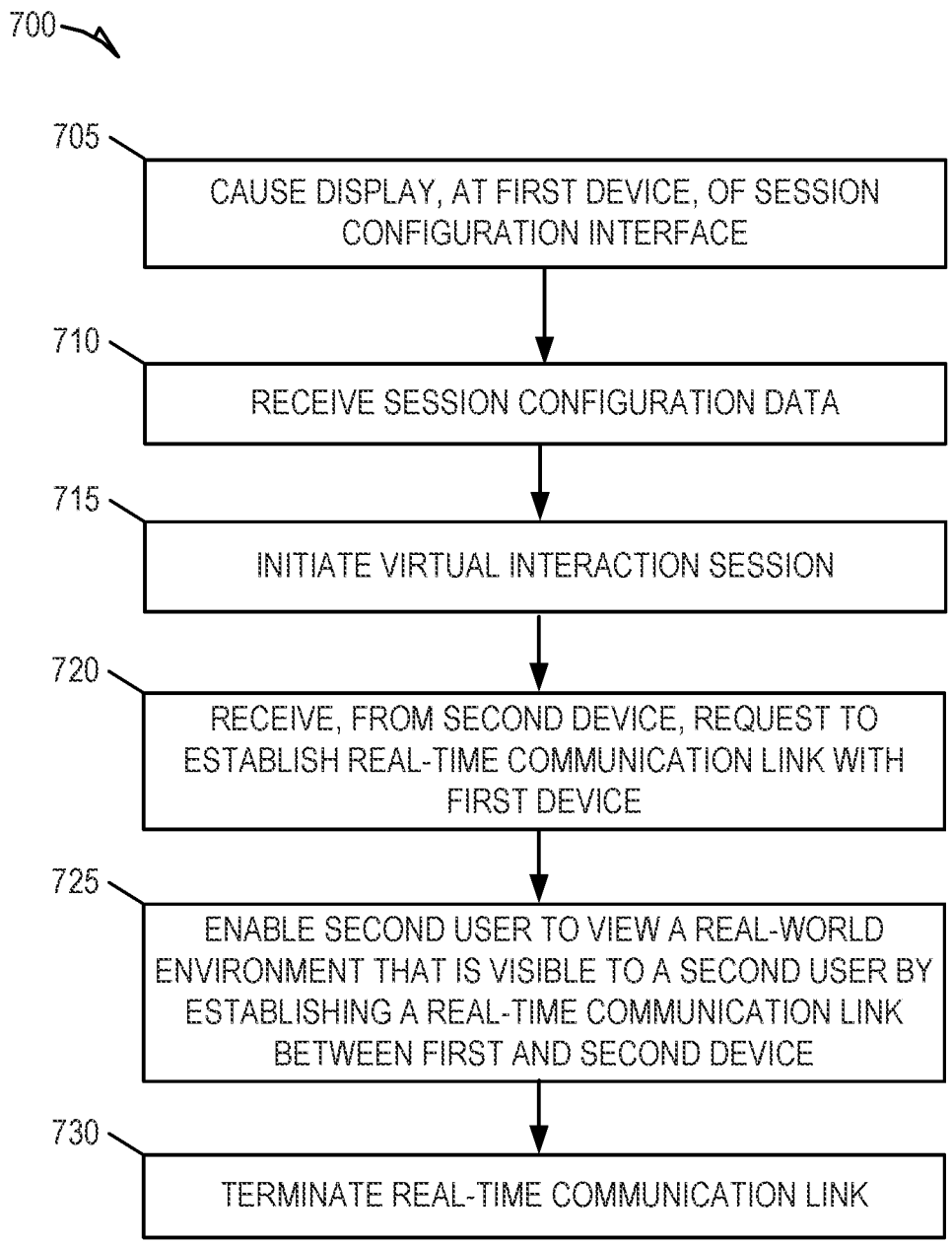
FIGS. 7-9 are flowcharts illustrating operations of the communication system in performing a method for facilitating a virtual interaction session with a first user, according to example embodiments.
Figure 8:
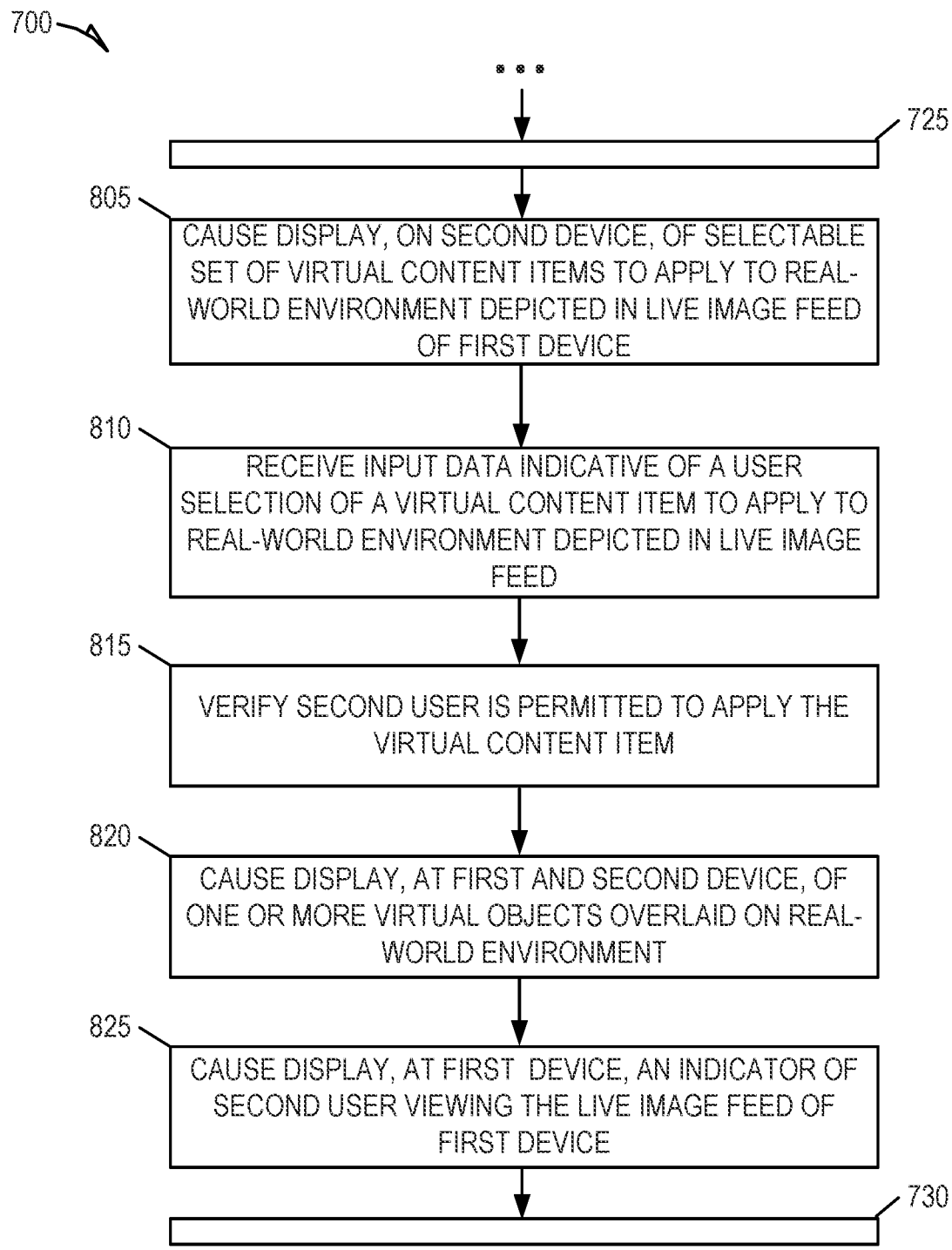
Figure 9:
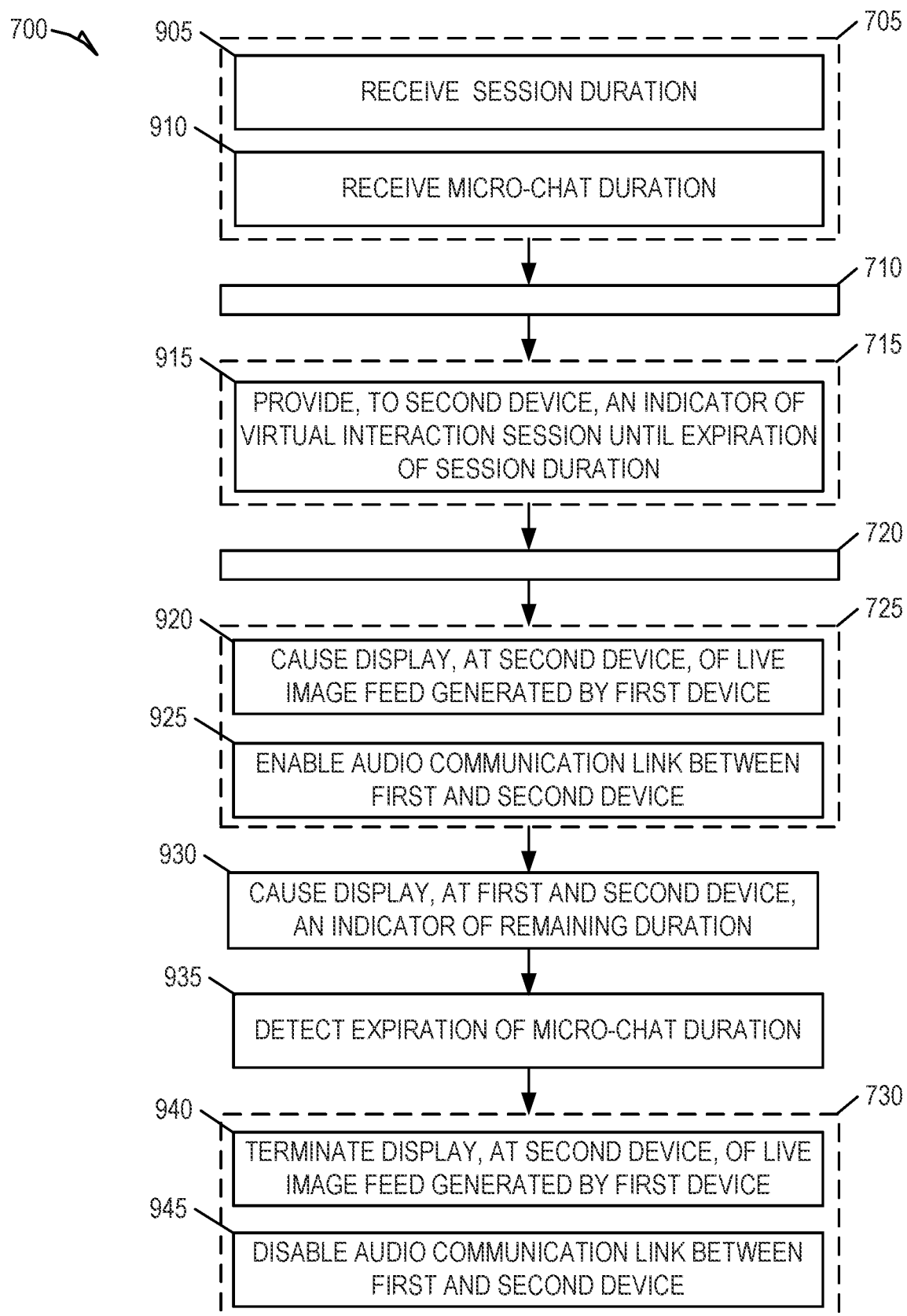

FIGS. 7-9 are flowcharts illustrating operations of the communication system in performing a method 700 for facilitating a virtual interaction session with a first user, according to example embodiments. The method 700 may be embodied in computer-readable instructions for execution by one or more processors such that the operations of the method 700 may be performed in part or in whole by the functional components of the communication system 100; accordingly, the method 700 is described below by way of example with reference thereto. However, it shall be appreciated that at least some of the operations of the method 700 may be deployed on various other hardware configurations than the communication system 100.

At operation 705, the application server 112 causes display of a session configuration interface (e.g., session configuration interface 504) on a first device (e.g., client device 102-1). The first device is associated with a first user (e.g., user 103-1). The session configuration interface comprises one or more elements for defining session configuration parameters associated with a virtual interaction session. As noted above, in the context of a virtual interaction session, one or more users that are invited by the first user can establish a real-time communication link with the first user to view a real-world environment at the first user's location and interact with the first user using both verbal and augmented related based communication modalities. The session configuration interface may include a combination of input fields, toggles, and other user interface input elements that can be used to specify configuration parameters that include: user identifiers associated with other users that are authorized to participate in the virtual interaction session; whether the first user is to approve of a real-time communication link before it is established; a session duration defining a time limit for the virtual interaction session; a micro-chat duration defining a time limit for real-time communication link established during the virtual interaction session; and a blur level.

At operation 710, the application server 112 receives session configuration data that includes one or more session parameters specified by the first user via the session configuration interface. As noted above, the one or more configuration parameters may include identifiers associated with other users that are authorized to participate in the virtual interaction session, a session duration, and a micro-chat duration. In some embodiments, the one or more configuration parameters may include a parameter that indicates whether micro-chats are enabled for the virtual interaction session. As noted above, a micro-chat is a time-limited real-time communication link between the first user and a second user. While the real-time communication link is established, the second user can view a real-world environment at the location of the first user and the first and second user can engage in verbal communication via audio communication link enabled between the users' devices.

At operation 715, the application server 112 initiates a virtual interaction session with the first user. In initiating the virtual interaction session, the application server 112 activates a camera coupled to the first device and causes the first device to transmit the live camera feed generated by the camera back to the application server 112. In some embodiments, the camera is an embedded camera of the first device. In some embodiments, the camera is an embedded camera of a companion device of the first device such as a wearable device (e.g., glasses 331).

At operation 720, the application server 112 receives a request from a second device to establish a real-time communication link with the first device. The second device is associated with a second user. The application server 112 enables the second user to participate in the real-time communication link based on the session configuration data specifying that the second user is authorized by the first user to participate in the virtual interaction session. In some embodiments, an invitation may be transmitted to the second device based on the session configuration data specifying that the second user is authorized by the first user to participate in the virtual interaction session. The invitation may include an interactive element (e.g., a button) that enables the second user to submit the request to establish the real-time communication link with the first device.

At operation 725, the application server 112 enables the second user to view a real-world environment at the location of the first user and interact with the first user by establishing the real-time communication link between the first and second device. The real-world environment is an environment at the location of the first user that is visible within the field of view of the camera coupled to first device. Accordingly, in establishing the real-time communication link, the application server 112 causes display of the live camera feed (generated by the camera and provided by the first device) on a display of the second device.

At operation 730, the application server 112 terminates the real-time communication link. In some instances, the application server 112 terminates the real-time communication link based on user input received from one of the two devices (e.g., input corresponding to a request to terminate the real-time communication link). In some instances, the application server 112 may terminate the real-time communication link based on expiration of a session duration defined by the session configuration data. Consistent with some embodiments, the application server 112 may terminate the real-time communication link based on expiration of a micro-chat duration defined by the session configuration data.

As shown in FIG. 8, the method 700 may, in some embodiments, include operations 805, 810, 815, 820, and 825. Consistent with these embodiments, the operations 805, 810, 815, 820, and 825 may be performed subsequent to operation 720 where the application server 112 establishes the real-time communication link between the first and second devices and prior to operation 725, where the application server 112 terminates the real-time communication link. In addition, consistent with some embodiments, the operations 805, 810, 815, 820, and 825 may be performed as part of a method that is independent of the operations of method 700.

At operation 805, the application server 112 causes display, on the second device, of a set of selectable virtual content items (e.g., to apply to the real-world environment at a location of a first user that is depicted in a live camera feed provided by the first device. Each virtual content item comprises one or more media objects. Media objects may be two or three dimensional.

At operation 810, the application server 112 receives, from the second device, user input indicative of a selection by the second user of a virtual content item (e.g., the virtual content item 516) from the set of virtual content items (e.g., the set of selectable virtual content items 514) to apply to the real-world environment depicted in the live camera feed.

At operation 815, the application server 112 verifies that the second user is permitted to apply the virtual content item to the real-world environment that is depicted in the live camera feed. Consistent with embodiments in which the virtual content item selection is made in the context of a virtual interaction session with the first user (e.g., embodiments in which the operation illustrated in FIG. 8 are performed as part of method 700), the application server 112 verifies that the second user is permitted to apply the virtual content item based on session configuration data. Consistent with some embodiments such as those in which the virtual content item selection is made in the context a standalone experience that is independent of a virtual interaction session with the first user (e.g., embodiments in which the operation illustrated in FIG. 8 are performed independent of operations of method 700), the application server 112 may verify the second user is permitted to apply the virtual content item based on user profile data associated with the first user.

At operation 820, the application server 112 causes both the first and second device to present the one or more media objects overlaid on the real-world environment depicted in the live camera feed provided by the first device based on the selected virtual content item. The application server 112 may maintain object definition data that defines the display of the virtual content item (i.e., the one or more media objects) and in causing display of the one or more media objects, the application server 112 may provide the first and second devices with the virtual content item definition data along with a set of instructions that causes the first and second device to display the one or more media objects overlaid on the real-world environment in accordance with the virtual content item definition data.

In some embodiments, the first device is a wearable device worn by the first user that includes optical elements that include a transparent display device. Consistent with these embodiments, the application server 112 causes the transparent display device to display the one or more media objects while allowing the first user to continue to view the real-world environment through the device. In this manner, the one or more media objects are presented by the transparent display device overlaid on the real-world environment.

In some embodiments, the first device is a wearable device worn by the first user that includes optical elements that include a non-transparent video display device. Consistent with these embodiments, the application server 112 causes the display device to augment image data that depicts the real-world environment with the virtual content item overlaid thereon.

The instructions provided to the second device cause the second device to display an augmented live camera feed that includes the one or more media objects of the virtual content item overlaid on the real-world environment. In some embodiments, the application server 112 may work in conjunction with a client application executing on the second device to augment image data from the live camera feed to include the one or more media objects overlaid on the real-world environment.

Consistent with some embodiments, in causing display of the augmented live camera feed at the second device, the application server 112 may cause one or more portions of the image to be blurred or otherwise obscured based, for example, on a blur level specified by the configuration parameters. As an example, a background of the live camera feed presented by the second device may be blurred based on the blur level while the foreground of the live camera feed remains unobscured. In another example, the entire image can be uniformly blurred based on the blur level.

At operation 825, the application server 112 causes display, at the first device, of an indicator that the second user is viewing the live camera feed provided by the first device. The indicator may include at least an identifier associator with the second user.

As shown in FIG. 9, the method 700 may, in some embodiments, include operations 905, 910, 915, 920, 925, 930, 935, 940, and 945. Consistent with these embodiments, the operations 905 and 910 may be performed as part of operation 710 where the application server 112 receives the session configuration information. At operation 905, the application server 112 receives a session duration. The session duration defines a time limit for the virtual interaction session. At operation 910, the application server 112 receives a user specified micro-chat duration. The user specified micro-chat duration defines a time limit for a real-time communication link between the first and second user.

Consistent with some embodiments, the operation 915 may be performed as part of operation 715 where the application server 112 initiates the virtual interaction session. At operation 910, the application server 112 provides an indicator of the virtual interaction session to the second device for display until expiration of the session duration. The indicator includes an interactive element (e.g., a button) that can be used by the second user to trigger transmission of a request to the application server 112 to establish the real-time communication link with the first user.

Consistent with these embodiments, the operations 920, 925, and 930 may be performed as part of the operation 720 where the application server 112 enables a real-time communication link between the first and second user. At operation 920, the application server 112 causes display of the live camera feed generated by the first device on the second device.

At operation 925, the application server 112 enables a real-time audio communication link between the first and second device. The audio communication link between the first and second device allow the first and second users to communicate verbally in real-time.

At operation 930, the application server 112 causes display of an indicator of a remaining duration at the first and second device. The remaining duration may correspond to either the time remaining in the virtual interaction session or in the real-time communication link between the first and second user depending on whether the session configuration data specifies that time-limited real-time communication links are enabled. In some embodiments, the application server 112 causes display of both an indicator of the time remaining in the virtual interaction session, and an indictor of the time remaining in the real-time communication link.

Consistent with some embodiments, the operation 935 may be performed prior to operation 730, where the application server 112 terminates the real-time communication link between the first and second user. At operation 935, the application server 112 detects expiration of the micro-chat duration. In these embodiments, the application server 112 terminates the real-time link between the first and second users based on expiration of the micro-chat duration.

Consistent with these embodiments the operations 940, and 945 may be performed as part of the operation 720 where the application server 112 terminates the real-time communication link between the first and second user. At operation 940, the application server 112 terminates the display of the live camera feed (generated by the first device) on the second device. Upon termination of the live camera feed, the second user is no longer able to view the real-world environment of the first user. An operation 945, the application server 112 disables the audio communication link between the first and second device thereby eliminating the ability for the first and second user to communicate verbally in real-time. In some embodiments, the application server 112 may further cause display of an indicator on the first and/or second device that the real-time communication link has been terminated.

Software Architecture

Figure 10:
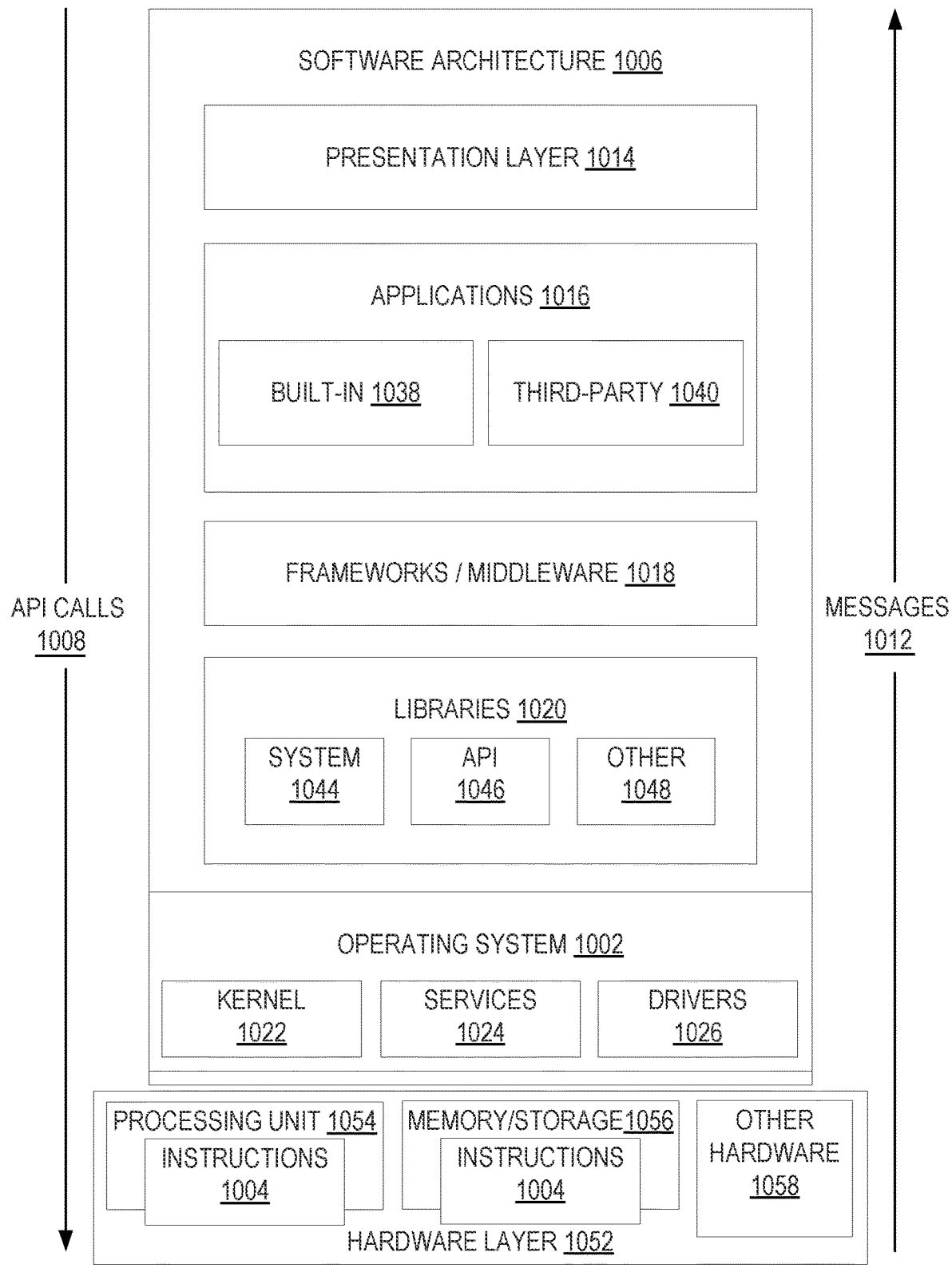
FIG. 10 is a block diagram illustrating a representative software architecture, which may be used in conjunction with various hardware architectures herein described, according to example embodiments.

FIG. 10 is a block diagram illustrating an example software architecture 1006, which may be used in conjunction with various hardware architectures herein described. FIG. 10 is a non-limiting example of a software architecture, and it will be appreciated that many other architectures may be implemented to facilitate the functionality described herein. The software architecture 1006 may execute on hardware such as a machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage modules 1056, which also have the executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frame works/middleware 1018, applications 1016, and a presentation layer 1014. Operationally, the applications 1016 and/or other components within the layers may invoke API calls 1008 through the software stack and receive a response to the API calls 1008 as messages 1012. The layers illustrated are representative in nature and not all software architectures have all layers. For example, some mobile or special-purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various GUI functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Figure 11:
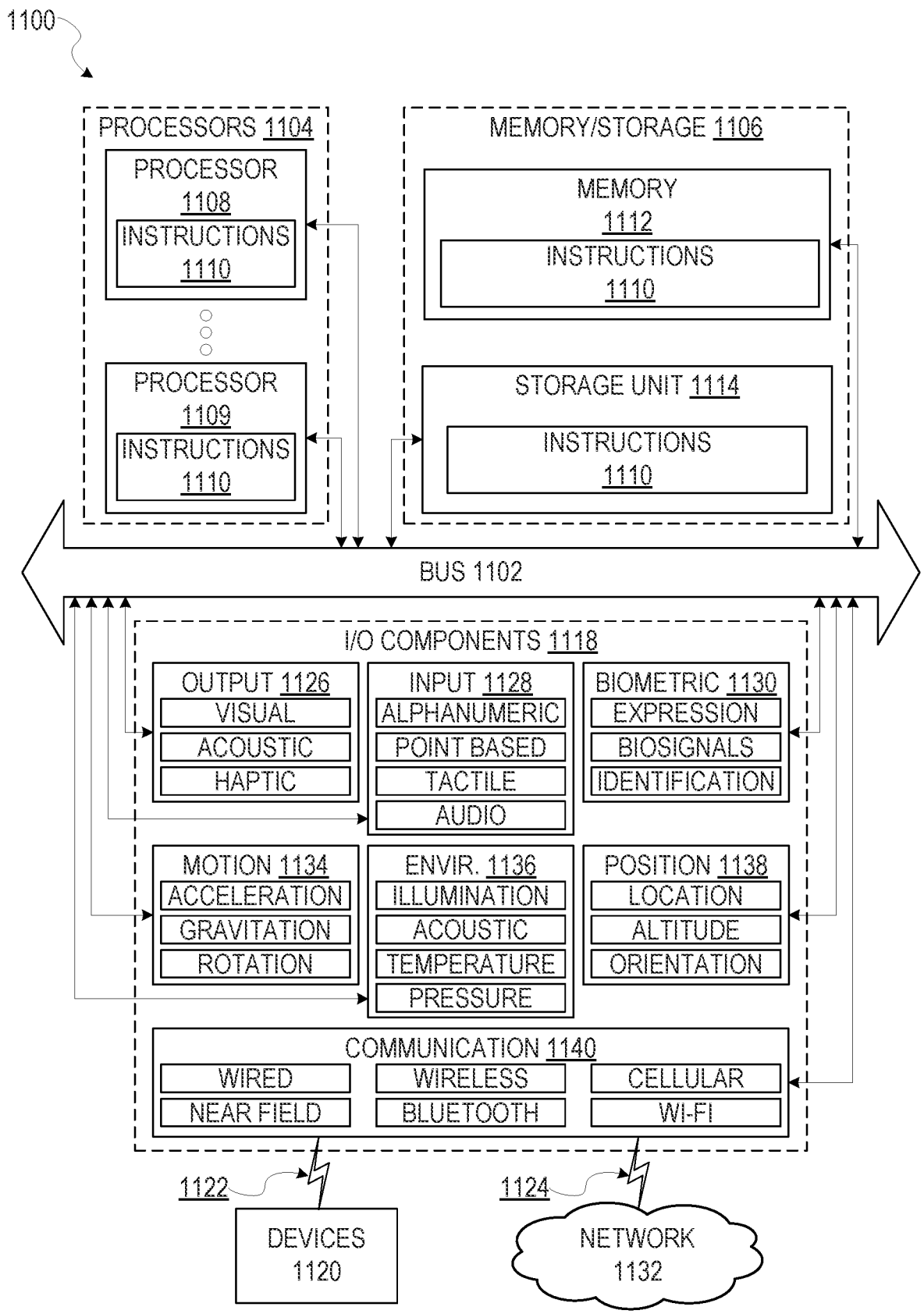
FIG. 11 is a block diagram illustrating components of a machine able to read instructions from a machine-readable medium (e.g., a machine-readable storage medium) and perform any one or more of the methodologies discussed herein, according to example embodiments.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. In an example embodiment, the processors 1104 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1108 and a processor 1109 that may execute the instructions 1110. Although FIG. 11 shows multiple processors 1104, the machine 1100 may include a single processor with a single core, a single processor with multiple cores (e.g., a multi-core processor), multiple processors with a single core, multiple processors with multiple cores, or any combination thereof.

The memory/storage 1106 may include a memory 1112, such as a main memory, or other memory storage, and a storage unit 1114, both accessible to the processors 1104 such as via the bus 1102. The storage unit 1114 and memory 1112 store the instructions 1110 embodying any one or more of the methodologies or functions described herein. The instructions 1110 may also reside, completely or partially, within the memory 1112, within the storage unit 1114, within at least one of the processors 1104 (e.g., within the processor's cache memory), or any suitable combination thereof, during execution thereof by the machine 1100. Accordingly, the memory 1112, the storage unit 1114, and the memory of the processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion, and the grouping is in no way limiting. In various example embodiments, the I/O components 1118 may include output components 1126 and input components 1128. The output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1118 may include biometric components 1130, motion components 1134, environment components 1136, or position components 1138, among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1138 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122, respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
receiving, from a first device of a first user, session configuration data including configuration parameters for a virtual interaction session with a first user, the configuration parameters indicating that a second user is permitted to join the virtual interaction session;
initiating the virtual interaction session based on the session configuration data;
establishing a first real-time communication link between the first user and the second user based on the virtual interaction session being initiated, the establishing of the first real-time communication link including causing display, by the second device, of a live camera feed generated at the first device, the live camera feed comprising images of a real-world environment visible to the first user;
terminating the first real-time communication link between the first user and the second user, the terminating of the first real-time communication link including terminating the display of the live camera feed by the second device;
upon termination of the first real-time communication link between the first user and the second user, providing an interactive element to the second device to trigger transmission of a request for a second real-time communication link between the first user and the second user; and
establishing the second real-time communication link between the first user and the second user in response to receiving the request while the virtual interaction session remains active.

2. The method of claim 1, wherein the establishing of the first real-time communication link between the first user and the second user further comprises enabling an audio communication link between the first and second devices.

3. The method of claim 2, wherein the terminating of the first real-time communication link further comprises disabling the audio communication link between the first and second devices.

4. The method of claim 1, further comprising:
causing display, by the first and second devices, of an indicator of time remaining in the first real-time communication link.

5. The method of claim 1, further comprising:
causing display, by the first device, of an indicator that the second user is viewing the live camera feed.

6. The method of claim 1, wherein:
the configuration parameters include a session duration that defines a time limit for the virtual interaction session;
the method further comprises:
detecting expiration of the time limit defined by the session duration; and
terminating the second real-time communication link between the first user and the second user in response to detecting the expiration of the time limit.

7. The method of claim 6, wherein:
the configuration parameters further specify that a third user is permitted to join the virtual interaction session;
the method further comprises enabling the third user to establish a third real-time communication link with the first user during the virtual interaction session; and
the third user is unable to establish the third real-time communication link with the first user at the expiration of the time limit defined by the session duration.

8. The method of claim 1, further comprising:
causing display, by the second device, of a set of selectable virtual content items to apply to the real-world environment that is visible to the first user.

9. The method of claim 8, further comprising:
receiving, from the second device, input data indicative of a selection by the second user of a virtual content item, from the set of selectable virtual content items, to apply to the real-world environment that is visible to the first user, the virtual content item comprising one or more media objects; and
based on receiving the input data, causing display, by the first device and the second device, of the one or more media objects overlaid on the live camera feed generated by the first device.

10. The method of claim 9, wherein causing display, by the second device, of the one or more media objects comprises causing display of the live camera feed augmented to include the one or more media objects overlaid on the real-world environment.

11. The method of claim 9, wherein:
the first device is a wearable device worn by the second user;
the wearable device comprises a transparent display; and causing the first device to display the one or more media objects overlaid on real-world environment comprises causing the transparent display to present the one or more media objects.

12. The method of claim 1, further comprising:
causing display, by the second device, of an indicator of the virtual interaction session with the first user based on the session configuration data.

13. The method of claim 12, wherein the configuration parameters further include a session duration, wherein the indicator is provided to the second device for display until expiration of the session duration.

14. A system comprising:
a memory that stores instructions; and
one or more processors configured by the instructions to perform operations comprising:
receiving, from a first device of a first user, session configuration data including configuration parameters for a virtual interaction session with a first user, the configuration parameters indicating that a second user is permitted to join the virtual interaction session;
initiating the virtual interaction session based on the session configuration data;
establishing a first real-time communication link between the first user and the second user based on the virtual interaction session being initiated, the establishing of the first real-time communication link including causing display, by the second device, of a live camera feed generated at the first device, the live camera feed comprising images of a real-world environment visible to the first user;
terminating the first real-time communication link between the first user and the second user, the terminating of the first real-time communication link including terminating the display of the live camera feed by the second device;
upon termination of the first real-time communication link between the first user and the second user, providing an interactive element to the second device to trigger transmission of a request for a second real-time communication link between the first user and the second user; and
establishing the second real-time communication link between the first user and the second user.

15. The system of claim 14, wherein the operations further comprise:
causing display, by the second device, of an indicator of the virtual interaction session with the first user based on the session configuration data,
wherein the configuration parameters further include a session duration that defines a time limit for the virtual interaction session; and
wherein the indicator is provided to the second device for display until expiration of the session duration.

16. The system of claim 15, wherein the operations further comprise:
detecting expiration of the time limit defined by the session duration; and
terminating the second real-time communication link between the first user and the second user in response to detecting the expiration of the time limit.

17. The system of claim 14, wherein:
the establishing of the first real-time communication link between the first user and the second user further comprises enabling an audio communication link between the first and second devices; and
the terminating of the real-time communication link further comprises disabling the audio communication link between the first and second devices.

18. The system of claim 14, wherein the operations further comprise:
causing display, by the second device, of a set of selectable virtual content items to apply to the real-world environment that is visible to the first user;
receiving, from the second device, input data indicative of a selection by the second user of a virtual content item, from the set of selectable virtual content items, to apply to the real-world environment that is visible to the first user, the virtual content item comprising one or more media objects; and
based on receiving the input data, causing display, by the first device and second device, of the one or more media objects overlaid on the live camera feed generated by the first device, wherein causing display, by the second device, of the one or more media objects comprises causing display of the live camera feed augmented to include the one or more media objects overlaid on the real-world environment.

19. The system of claim 18, wherein:
the first device is a wearable device worn by the second user;
the wearable device comprises a transparent display; and
causing the first device to display the one or more media objects overlaid on real-world environment comprises causing the transparent display to present the one or more media objects.

20. A machine-readable medium storing instructions that, when executed by a computer system, cause the computer system to perform operations comprising:
receiving, from a first device of a first user, session configuration data including configuration parameters for a virtual interaction session with a first user, the configuration parameters indicating that a second user is permitted to join the virtual interaction session;
initiating the virtual interaction session based on the session configuration data;
establishing a first real-time communication link between the first user and the second user based on the virtual interaction session being initiated, the establishing of the first real-time communication link including causing display, by the second device, of a live camera feed generated at the first device, the live camera feed comprising images of a real-world environment visible to the first user;
terminating the first real-time communication link between the first user and the second user, the terminating of the first real-time communication link including terminating the display of the live camera feed by the second device;
upon termination of the first real-time communication link between the first user and the second user, providing an interactive element to the second device to trigger transmission of a request for a second real-time communication link between the first user and the second user; and
establishing the second real-time communication link between the first user and the second user.

* * * * *